(12) United States Patent
Milligan et al.

(10) Patent No.: US 10,979,413 B2
(45) Date of Patent: *Apr. 13, 2021

(54) AUTHENTICATION AND PAIRING OF DEVICES USING A MACHINE READABLE CODE

(71) Applicant: Microsoft Technology Licensing, LLC, Redmond, WA (US)

(72) Inventors: Ian Milligan, Mississauga (CA); Abhishek Agarwal, Redmond, WA (US); John Sanders, Seattle, WA (US); Joshua S. Bolduc, Seattle, WA (US); David Gray, Bellevue, WA (US); Skji Conklin, Redmond, WA (US); Gary Caldwell, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/406,436

(22) Filed: May 8, 2019

(65) Prior Publication Data
US 2019/0313470 A1 Oct. 10, 2019

Related U.S. Application Data

(63) Continuation of application No. 15/981,259, filed on May 16, 2018, now Pat. No. 10,362,614, which is a
(Continued)

(51) Int. Cl.
*H04M 3/16* (2006.01)
*H04L 29/06* (2006.01)
(Continued)

(52) U.S. Cl.
CPC .............. *H04L 63/08* (2013.01); *H04L 63/18* (2013.01); *H04M 1/7253* (2013.01); *H04W 4/60* (2018.02);
(Continued)

(58) Field of Classification Search
CPC ......... H04L 63/08; H04L 63/18; H04L 67/02; H04L 67/141; H04L 63/083; H04L 29/06;
(Continued)

(56) References Cited

U.S. PATENT DOCUMENTS 6,215,992 B1 * 4/2001 Howell .................. G10L 15/30
455/412.1
8,002,175 B2 8/2011 Kuriyama et al.
(Continued)

FOREIGN PATENT DOCUMENTS

CN          102592156 A    7/2012
CN          102868696 A    1/2013
(Continued)

OTHER PUBLICATIONS

"Second Office Action issued in Chinese Patent Application No. 201580013879.6", dated May 8, 2019, 17 Pages.
(Continued)

*Primary Examiner* — Ronald Eisner
(74) *Attorney, Agent, or Firm* — Christopher J. Volkmann; Kelly, Holt & Christenson, PLLC

(57) ABSTRACT

An MR code is generated within a browser on a client device and is read by a mobile application on a mobile device. A communication channel is then established through a web-based service, between the browser and the mobile application on the mobile device. The mobile application generates a user interface display on the mobile device that allows user selection of content. The mobile application sends a link to that content to the browser, which accesses and renders the content on the client device. User input commands to control the rendered content are also received at the mobile device and sent to the browser through the communication channel.

12 Claims, 26 Drawing Sheets

Related U.S. Application Data continuation of application No. 15/499,495, filed on Apr. 27, 2017, now Pat. No. 10,004,094, which is a continuation of application No. 14/987,844, filed on Jan. 5, 2016, now Pat. No. 9,668,289, which is a continuation of application No. 14/209,331, filed on Mar. 13, 2014, now Pat. No. 9,265,079.

(51) Int. Cl.

| | |
|---|---|
| H04W 12/06 | (2021.01) |
| H04M 1/725 | (2021.01) |
| H04W 4/60 | (2018.01) |
| H04W 4/80 | (2018.01) |
| H04W 76/14 | (2018.01) |
| H04W 88/02 | (2009.01) |
| H04W 84/12 | (2009.01) |

(52) U.S. Cl.
CPC .............. *H04W 4/80* (2018.02); *H04W 12/06* (2013.01); *H04W 76/14* (2018.02); *H04W 84/12* (2013.01); *H04W 88/02* (2013.01)

(58) Field of Classification Search
CPC .............. H04L 9/3228; H04M 1/7253; H04M 17/30–302; H04M 17/304; H04M 17/307; H04M 17/308; H04M 2017/282537; H04M 2017/255–2593; H04W 12/06; H04W 4/60; H04W 4/80; H04W 76/11; H04W 76/12; H04W 76/14; H04W 84/12; H04W 88/02; H04W 12/00503; H04W 12/00522; H04N 1/32775; G06F 21/36; G06F 21/445; G06F 2221/2129
USPC ................................. 455/26.1, 410–415, 565
See application file for complete search history.

(56) References Cited

U.S. PATENT DOCUMENTS

| | | | |
|---|---|---|---|
| 8,256,664 B1* | 9/2012 | Balfanz | G06F 21/43 235/375 |
| 9,107,055 B2 | 8/2015 | Zerr et al. | |
| 9,225,700 B1* | 12/2015 | Dotan | H04L 63/08 |
| 9,363,661 B2 | 6/2016 | Chan et al. | |
| 9,497,293 B2 | 11/2016 | Somadder et al. | |
| 9,794,253 B2 | 10/2017 | Narayan et al. | |
| 9,807,070 B2 | 10/2017 | Ren | |
| 9,999,013 B2 | 6/2018 | Cacioppo | |
| 10,257,341 B2 | 4/2019 | Ivashyn | |
| 2010/0241857 A1* | 9/2010 | Okude | B60R 25/24 713/168 |
| 2012/0240204 A1 | 9/2012 | Bhatnagar et al. | |
| 2013/0173915 A1* | 7/2013 | Haulund | H04L 63/0853 713/159 |
| 2013/0193201 A1 | 8/2013 | Bradley et al. | |
| 2013/0219479 A1* | 8/2013 | DeSoto | H04W 12/06 726/6 |
| 2013/0262857 A1* | 10/2013 | Neuman | H04L 63/045 713/155 |
| 2014/0067571 A1 | 3/2014 | Fricke et al. | |
| 2014/0245396 A1 | 8/2014 | Oberheide et al. | |
| 2014/0282923 A1 | 9/2014 | Narayan et al. | |
| 2014/0308922 A1 | 10/2014 | Di et al. | |
| 2015/0032578 A1 | 1/2015 | Bicer | |
| 2015/0041530 A1 | 2/2015 | Burkhart et al. | |
| 2015/0245281 A1 | 8/2015 | Beguin et al. | |
| 2016/0065370 A1 | 3/2016 | Le Saint et al. | |
| 2016/0099938 A1 | 4/2016 | Seo et al. | |
| 2016/0180072 A1 | 6/2016 | Ligatti et al. | |
| 2016/0241402 A1 | 8/2016 | Gordon et al. | |
| 2016/0286393 A1 | 9/2016 | Rasheed et al. | |
| 2016/0294842 A1 | 10/2016 | Ramalingam et al. | |
| 2017/0012959 A1 | 1/2017 | Sierra et al. | |
| 2017/0061112 A1 | 3/2017 | Bandyopadhyay et al. | |
| 2017/0264608 A1 | 9/2017 | Moore et al. | |
| 2018/0027078 A1 | 1/2018 | Sinn et al. | |
| 2018/0262486 A1 | 9/2018 | Zhu et al. | |

FOREIGN PATENT DOCUMENTS

| | | |
|---|---|---|
| CN | 103229559 A | 7/2013 |
| CN | 103428001 A | 12/2013 |
| CN | 103532971 A | 1/2014 |
| CN | 103563346 A | 2/2014 |
| WO | 2014036568 A1 | 3/2014 |

OTHER PUBLICATIONS

"Office Action Issued in Mexican Patent Application No. MX/a/2016/011475", dated Jan. 17. 2020, 6 Pages.

Flanagan, "Pairing devices using QR-Codes", Retrieved from https://www.qrcode.es/en/pairing-devices-using-qr-codes/, Apr. 23, 2013, 6 Pages.

"Office Action Issued in Indian Patent Application No. 201647030879", dated Apr. 24, 2020, 6 Pages.

"Android Devices: Enterprise use Cases", Retrieved from: https://developers.google.com/android/work/overview, Retrieved on: Jul. 28, 2020, 7 pages.

"Android Enterprise Feature List", Retrieved from: https://developers.google.com/android/work/requirements, Jul. 30, 2020, 27 Pages.

"Device Setup Methods", Retrieved from: https://support.google.com/work/android/answer/9566881, Retrieved on: Jul. 14, 2020, 1 Page.

"Enroll and Provision a Device", Retrieved from: https://developers.google.com/android/management/provision-device, Retrieved on: Jul. 30, 2020, 9 pages.

"For Enterprise", Retrieved from: https://www.android.com/intl/en_in/enterprise/enrollment/, Retrieved on: Jul. 14, 2020, 10 Pages.

"KinLogix EMR User Guide Mobile Application", Published by TELUS Health Solutions GP, Oct. 20, 2014, 22 Pages.

"Provision Devices", Retrieved from: https://developers.google.com/android/work/play/emm-api/prov-devices#create_a_qr_code, Retrieved on Jul. 30, 2020, 33 Pages.

"Set up and Manage Android Management Experience", Retrieved from: https://support.google.com/work/android/answer/7168897?hl=en, Retrieved on: Jul. 14, 2020, 1 Page.

"Understanding Android API Levels", Retrieved from: https://developer.xamarin.com/guides/android/application_fundamentals/understanding_android_api_levels/, Retrieved on Apr. 17, 2017, 5 Pages.

"Final Office Action Issued in U.S. Appl. No. 15/454,836", dated Jun. 11, 2019, 20 Pages.

"Final Office Action Issued in U.S. Appl. No. 15/454,836", dated Apr. 15, 2020, 28 Pages.

"Non Final Office Action Issued in U.S. Appl. No. 15/454,836", dated Oct. 15, 2019, 22 Pages.

"Non Final Office Action Issued in U.S. Appl. No. 15/454,836", dated Nov. 27, 2018, 18 Pages.

Bayton, Jason, "What is Android Enterprise?", Retrieved from: https://bayton.org/docs/enterprise-mobility/android/what-is-android-enterprise-and-why-is-it-used/, Feb. 12, 2020, 10 Pages.

Burke, Dave, "Taking the Final Wrapper off of Android 7.0 Nougat", Retrieved from: https://android-developers.googleblog.com/2016/08/taking-final-wrapper-off-of-nougat.html?utrn_source:::feedburner&utm_medium=feed&utm_campaign=Feed:+blogspotlhsDu+ (Android+Developers+Blog), Aug. 22, 2016, 3 pages.

Chang, et al., "Remote Password Authentication with Smart Cards", In IEE Proceedings of E-Computers and Digital Techniques, vol. 138, Issue 3, May, 1991, pp. 165-168.

Constine, Josh, "How Snapchat Made QR Codes Cool Again", Retrieved From: https://techcrunch.com/2015/05/04/snapcode/, May 4, 2015, 12 Pages.

Harini, et al., "2CAuth: A New Two Factor Authentication Scheme Using QR-Code", In International Journal of Engineering and Technology, vol. 5, Issue 2, Apr., 2013, pp. 1087-1094.

(56) References Cited

OTHER PUBLICATIONS

Kim, et al., "A Design of User Authentication System Using QR code Identifying Method", in Proceedings of 6th International Conference on Computer Sciences and Convergence Information Technology., Nov. 29, 2011, 31-35 pages.
Liao, et al., "A Novel User Authentication Scheme Based on QR-Code", In Journal of Networks, vol. 5, Issue 8, pp. 937-941.
"International Search Report and Written Opinion Issued in PCT Application No. PCT/US18/020347", dated May 17, 2018, 13 pages.
Sethi, et al., "Secure Bootstrapping of Cloud-Managed Ubiquitous Displays", in Proceedings of the ACM International Joint Conference on Pervasive and Ubiquitous Computing, Sep. 13, 2014, pp. 739-750.
Thurrott, Paul, "Google Announces the Release of Androit 7.0 Nougat", Retrieved from: https:www.thurrott.com/mobile/android/77251/google-announces-release-android-7.0-nougat, Aug. 22, 2016, 6 Pages.
"Office Action Issued in Brazilian Patent Application No. BR112016020198-1", dated Aug. 21, 2020, 5 pages.
"First Office Action and Search Report Issued in Chinese Patent Application No. 202010004975.7", dated Nov. 27, 2020, 21 Pages.

\* cited by examiner

AUTHENTICATION AND PAIRING OF DEVICES USING A MACHINE READABLE CODE

CROSS-REFERENCE TO RELATED APPLICATIONS

The present application is a continuation of and claims priority of U.S. patent application Ser. No. 15/981,259, filed May 16, 2018, which is a continuation of and claims priority of U.S. patent application Ser. No. 15/499,495, filed Apr. 27, 2017, which is a continuation of and claims priority of U.S. patent application Ser. No. 14/987,844, filed Jan. 5, 2016, which is a continuation of and claims priority of U.S. patent application Ser. No. 14/209,331, filed Mar. 13, 2014, the contents of these applications are hereby incorporated by reference in their entirety.

BACKGROUND

Some computer systems currently exist that allow a user to sign in, and present content on one computing device, while controlling it from another computing device. For instance, some systems allow a user to sign in and control a large screen device, using the user's mobile device.

Such systems usually have a user login to one or the other computing device. Many users do not feel comfortable using their username and password, especially on a computing device that they do not own. Users can be concerned that key strokes are logged and the information will be surreptitiously used.

There also currently exist some systems for pairing computing devices so that they can communicate with each other in a trusted way. One current process for doing this has a user first pick a nearby device. It then prompts the user to enter an identical code on both devices. Other processes use the proximity of the two devices to automatically connect, and prompt the user on each device, ensuring that no unintended connections are made.

In other systems, if the user is logged in on all of his or her devices, then two devices can communicate in a trusted way. However, the user normally needs to go through a prior setup process. Thus, the user normally needs to own all of the devices being set up in this fashion.

Current systems also allow a user to present content on a large screen device, using a mobile device. One current system for doing this has the user connect the mobile device to the large screen device by plugging an HDMI, DVI, or other connection cable. This type of system streams the view of the content from the mobile device to the larger screen. However, the direct hard wiring can present certain problems. Other systems have attempted to perform this type of communication wirelessly, but they involve the use of a pairing mechanism, which can be quite time consuming In all of these types of systems, the amount of data that needs to be transmitted from the mobile device to the large screen device is generally very high.

In the systems discussed above that pair two devices, the user normally needs to login on both of the paired devices. There then exists a channel for the devices to communicate with one another. This does not address a scenario in which a user may walk into a colleague's office, and wishes to share a document on the colleague's computer. The mechanism by which this is currently done is to have the user login to the colleague's computer and then manually search for the content or document.

Machine readable labels (or MR codes) are labels that contain information about an item. Some examples of MR codes include optical codes, such as barcodes, matrix barcodes (such as QR codes) and extended matrix barcodes, among others. Other examples of MR codes are codes that are transmitted using near field communication.

The discussion above is merely provided for general background information and is not intended to be used as an aid in determining the scope of the claimed subject matter.

SUMMARY

An MR code is generated within a browser on a client device and is read by a mobile application on a mobile device. A communication channel is then established through a web-based service, between the browser and the mobile application on the mobile device. The mobile application generates a user interface display on the mobile device that allows user selection of content. The mobile application sends a link to that content to the browser, which accesses and renders the content on the client device. User input commands to control the rendered content are also received at the mobile device and sent to the browser through the communication channel.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 2 is a flow diagram illustrating one embodiment of the operation of the architecture shown in FIG. 1 in which a user logs in to a mobile application.

FIGS. 3-1 and 3-2 (collectively FIG. 3) show a flow diagram illustrating one embodiment of the operation of the architecture shown in FIG. 1 in authenticating a user and establishing a connection between a mobile application and a browser on a client device.

DETAILED DESCRIPTION

Figure 1:
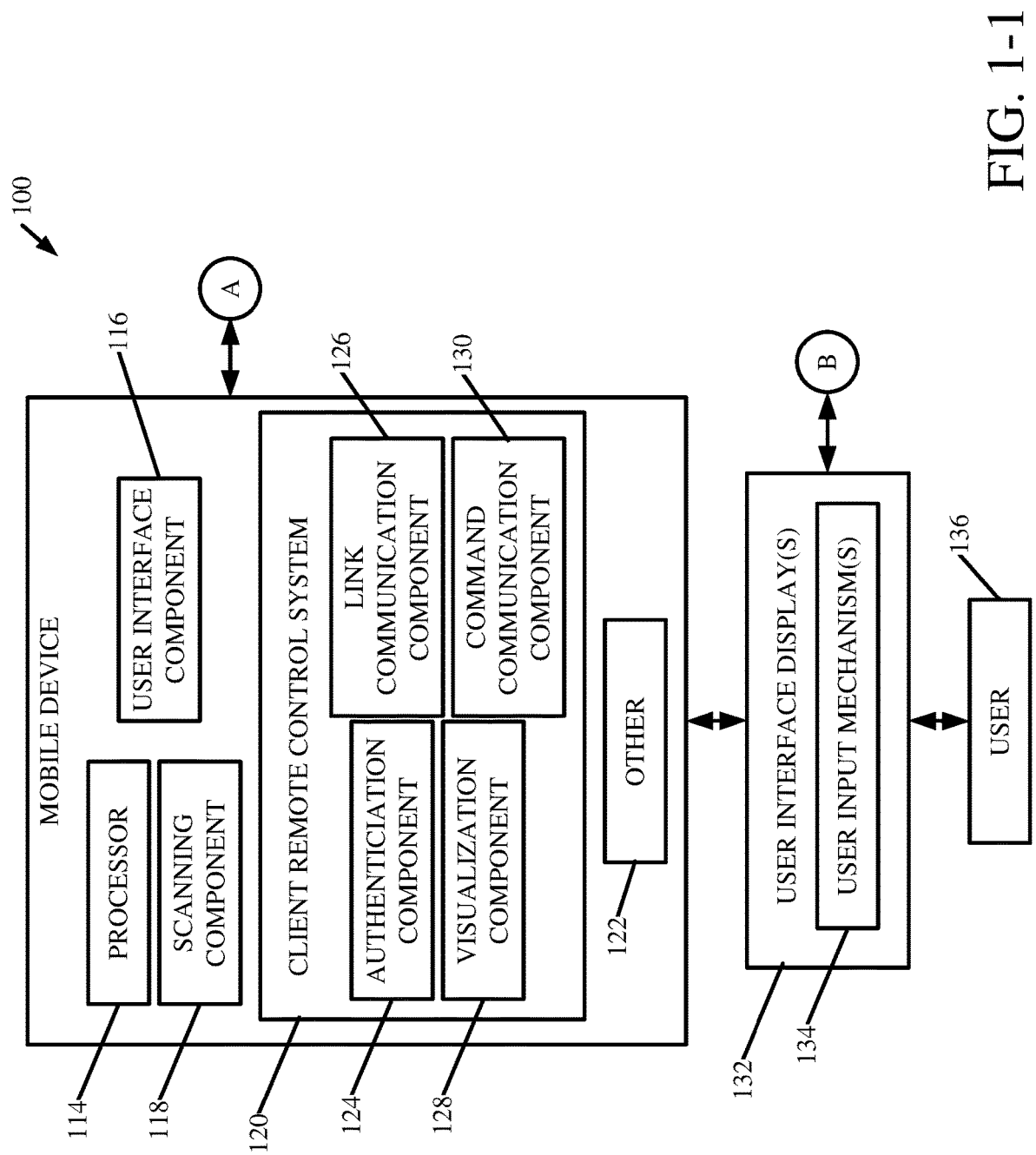
FIGS. 1-1 and 1-2 (collectively FIG. 1) show a block diagram of one embodiment of an authentication and pairing architecture.
Figures 1, 2:
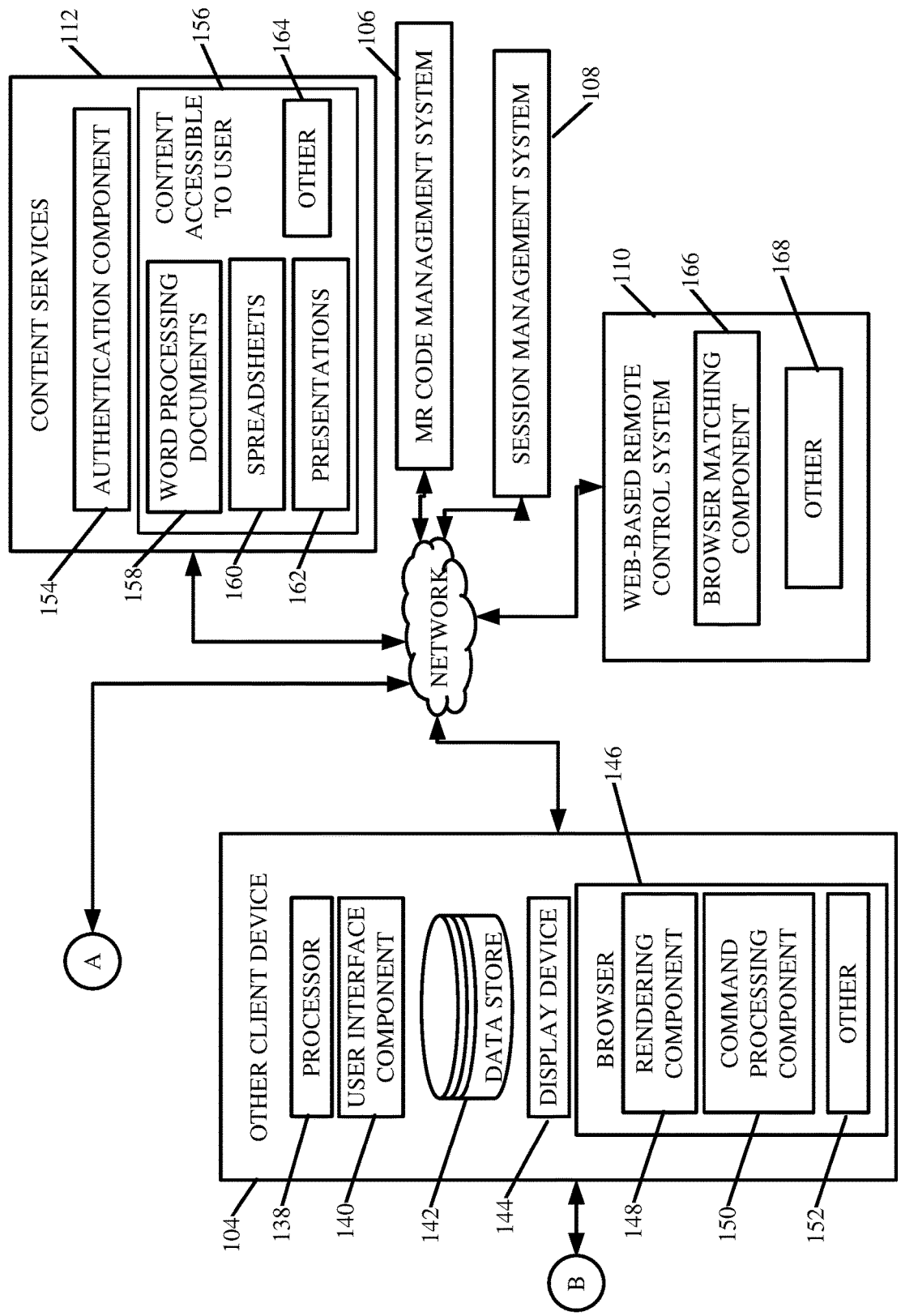

FIGS. 1-1 and 1-2 (collectively FIG. 1) show a block diagram of one illustrative authentication and pairing architecture 100. Architecture 100 includes mobile device 102, another client device 104, a set of web-based services including an MR code management system 106, a session management system 108 and a web-based remote control system 110. It also illustratively includes a set of content services 112. In the embodiment shown in FIG. 1, mobile device 102 illustratively includes processor 114, user interface component 116, scanning component 118, and client remote control system 120 (which can be a mobile application run on mobile device 102), and it can include other components 122 as well.

Architecture 100 will be described herein with respect to an example in which the MR code is an optical code, that is scanned by scanning component 118. However, it can also be other MR codes, such as a code presented using near field communication, or a code that is presented audibly and read and decoded using a listening component, such as a microphone. All of these configurations are contemplated herein.

Remote control system 120, itself, includes authentication component 124, link communication component 126, visualization component 128 and command communication component 130. Mobile device 102 illustratively generates user interface displays 132, with user input mechanisms 134, for interaction by user 136. As is described in greater detail below, client device 104 can also generate such user interface displays and user input mechanisms.

While a more detailed description of some exemplary mobile devices is provided below with respect to FIGS. 6-10, the authentication and pairing processes described herein will refer to mobile device 102.

Client device 104 illustratively includes processor 138, user interface component 140, data store 142 and display device 144. It also illustratively includes browser 146 that, itself, includes rendering component 148, command processing component 150, and other components 152.

Content services 112 illustratively provide services that allow user 136 to authenticate themselves using authentication component 154, and generate, and access, content 156. In one embodiment, the content 156 is authored and accessed through a set of information worker applications, such as a word processing application, a spreadsheet application, a presentation application, or other applications. Therefore, the content 156 can include word processing documents 158, spreadsheets 160, presentations 162, and other content 164.

FIG. 1 also shows that, in one embodiment, web-based remote control system 110 includes a browser matching component 166. It can also include other components 168 as well.

Figure 1A:
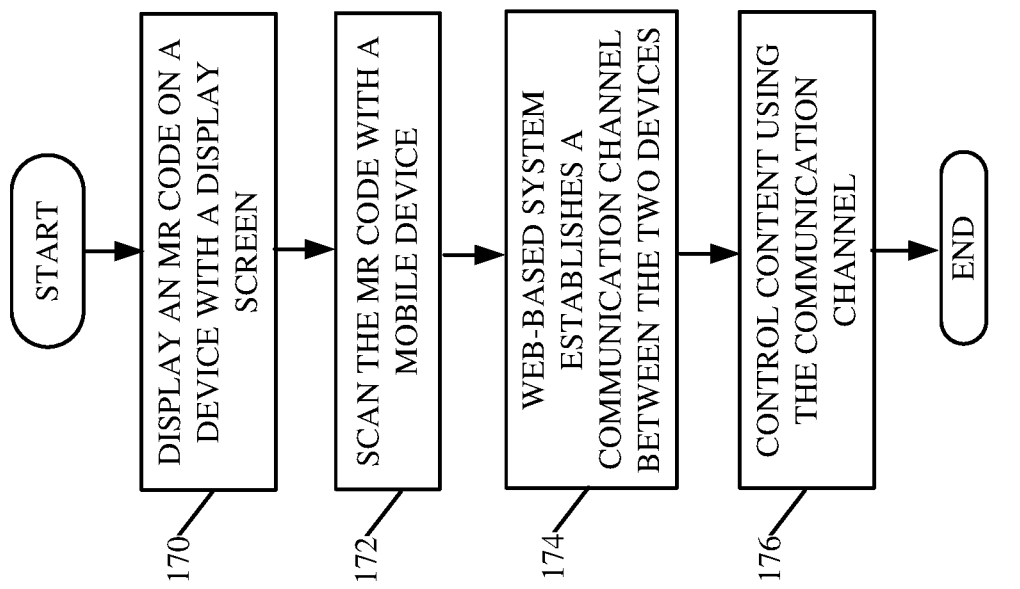
FIG. 1A is a simplified flow diagram showing how a mobile device and another client device establish a communication channel.
Figure 2:
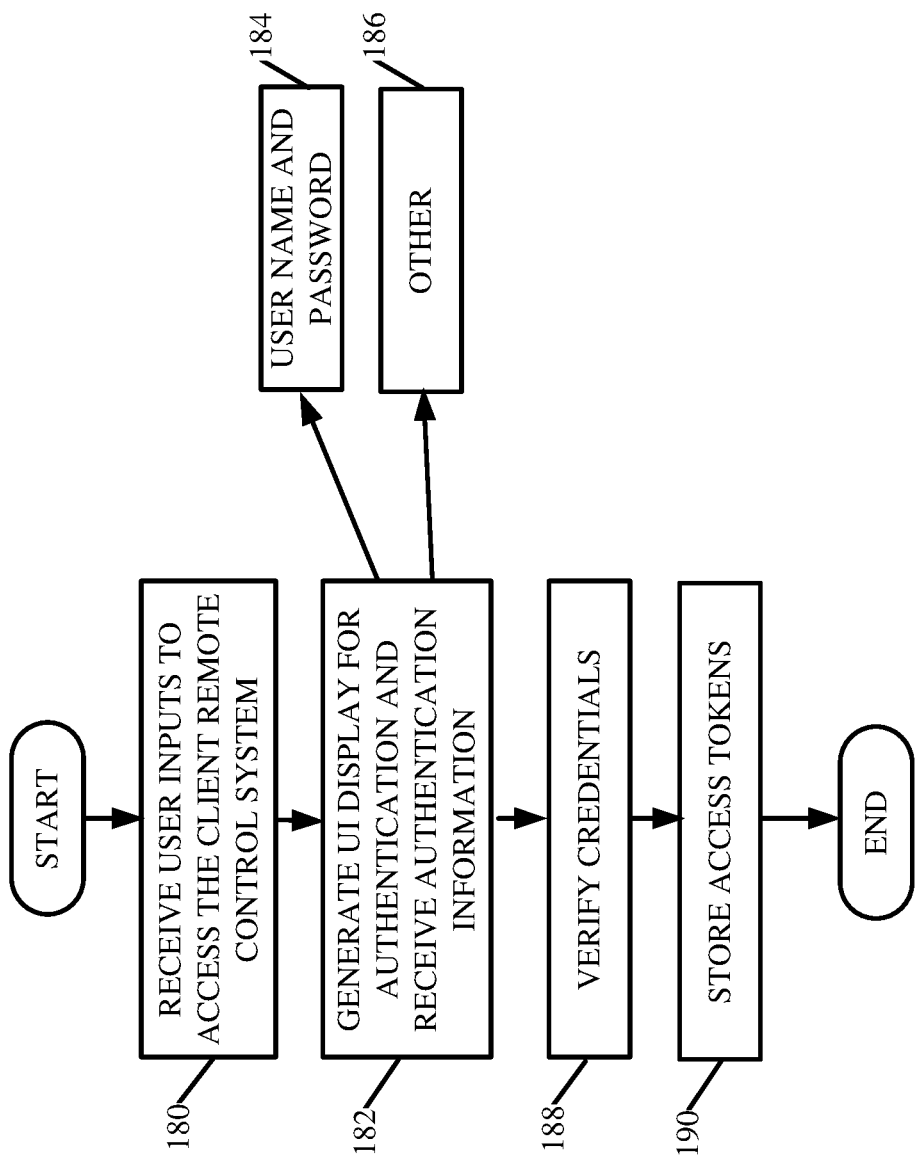

Before describing the overall operation of architecture 100 in greater detail, a brief overview is first provided with respect to FIG. 1 and the simplified flow diagram of FIG. 1A. User 136 can illustratively authenticate himself or herself to architecture 100 and then have content rendered on client device 104 (which can be a desktop computer, large screen display device or other device), through browser 146, while controlling that content with mobile device 102. To do this, in one embodiment, user 136 first navigates to a login page of web-based remote control system 110 using client device 104. Client device 104 receives an MR code and displays it on display device 144. This is indicated by block 170 in FIG. 1A. User 136 scans the MR code using scanning component 118 of mobile device 102. This is indicated by block 172. In response, browser matching component 166 of web-based remote control system 110 establishes a connection between browser 146 and client remote control system 120. This is indicated by block 174. Client remote control system 120 can thus provide browser 146 with links to content 156. Using authentication information provided by user 136, browser 146 obtains the desired content 156 and renders it on display device 144. User 136 can then use client remote control system 120 to provide commands to browser 146 using the communication channel that has been established through web-based remote control system 110, to navigate through, and otherwise control, the content being rendered by browser 146 on display device 144. This is indicated by block 176 in FIG. 1A.

FIG. 2 is a more detailed flow diagram illustrating one embodiment of the operation of architecture 100, in allowing user 136 to initially authenticate himself or herself with client remote control system 120 and web-based remote control system 110. In one embodiment, since mobile device 102 is illustratively a personal device, user 136 only needs to sign in or authenticate himself or herself once. This can be performed during the initial launch of client remote control system 120 or otherwise. Mobile device 102 thus initially receives user inputs from user 136 indicating that the user wishes to access the client remote control system 120. This is indicated by block 180 in FIG. 2.

User interface component 116, either under the control of client remote control system 120, or by itself, then generates a user interface display for authentication of user 136. It also receives authentication information from the user. This is indicated by block 182. The authentication information can take a variety of different forms. In one embodiment, it comprises a username and password 184. However, it can include other information 186 as well.

Authentication component 124 in client remote control system 120 then verifies the credentials entered by user 136. This is indicated by block 188 in FIG. 2. This can be done by providing the credentials to content services 112 or another service that verifies credentials for user 136. In response, component 124 receives an access token 190 corresponding to user 136. Authentication component 124 then illustratively stores the access token 190 for user 136, once the credentials have been identified.

Figures 1, 3:
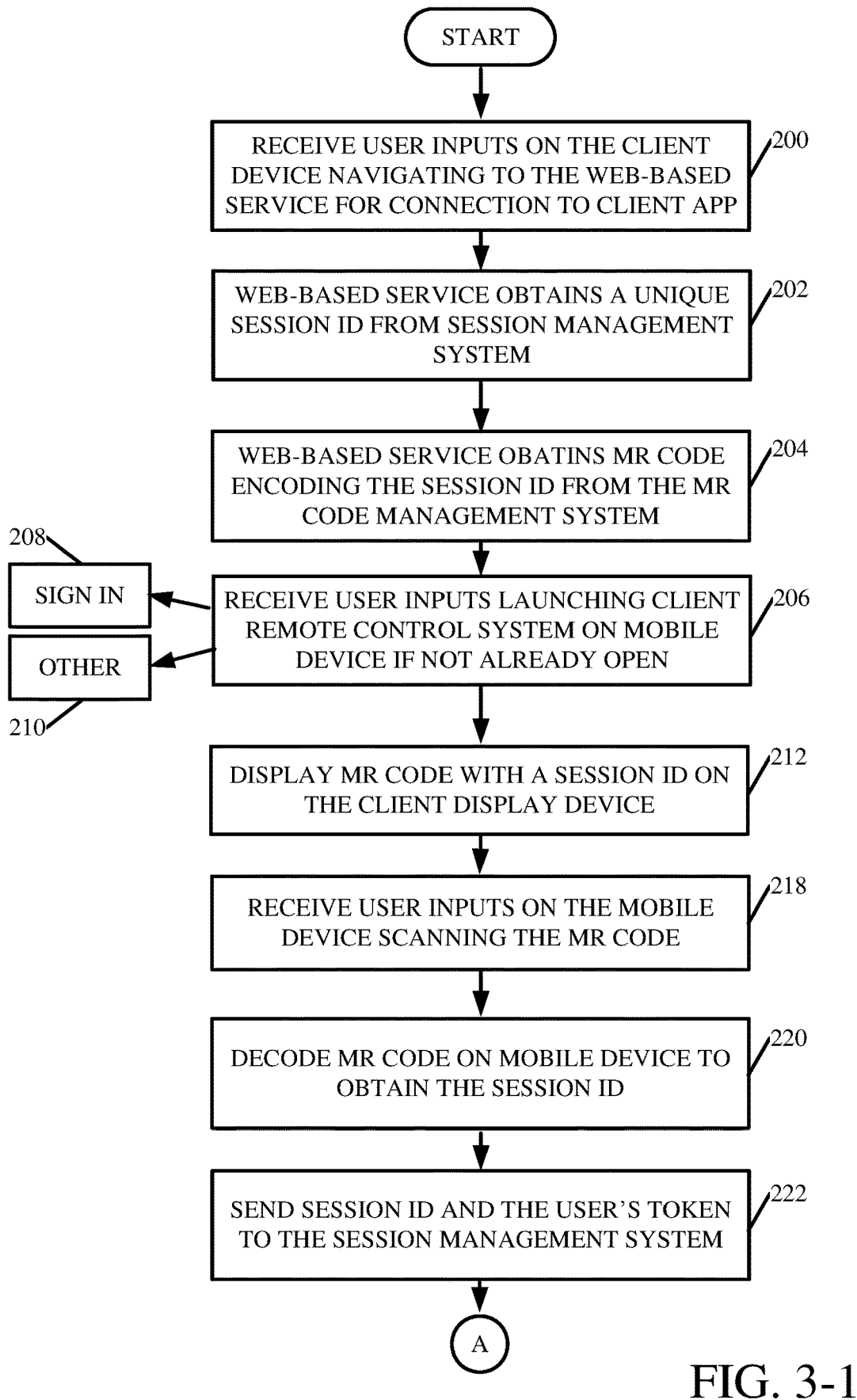
Figures 2, 3:
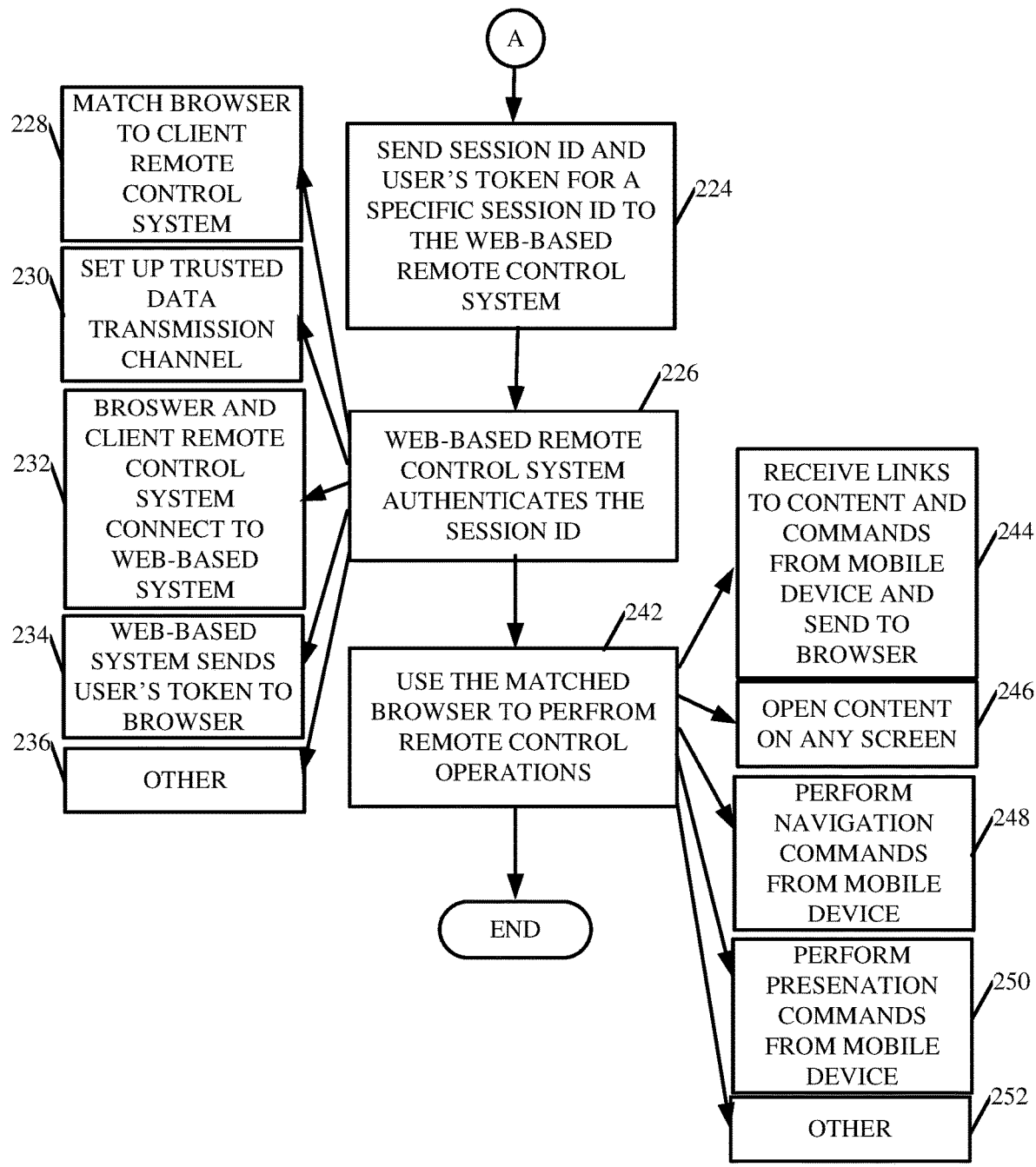

FIGS. 3-1 and 3-2 (collectively FIG. 3) show a flow diagram illustrating one embodiment of the operation of architecture 100 in allowing user 136 to establish a communication channel between client remote control system 120 and browser 146 on client device 104, through web-based remote control system 110. Browser 146 first receives user inputs on client device 104 navigating to the web-based service 110 for connection to client remote control system 120. This is indicated by block 200 in the flow diagram of FIG. 3. Web-based remote control system 110 then accesses session management system 108, which manages various sessions within architecture 100. System 108 provides web-based remote control system 110 with a unique session identifier (session ID). This is indicated by block 202. Web-based remote control system 110 also accesses MR code management system 106 to obtain a MR code that encodes the session ID obtained from system 106. This is indicated by block 204 in FIG. 3.

If the user has not yet launched client remote control system 120 on mobile device 102, mobile device 102 receives user inputs launching the client remote control system 120. This is indicated by block 206 in FIG. 3. This can be done by the user providing sign in information 208, or in other ways 210.

Figure 3A:
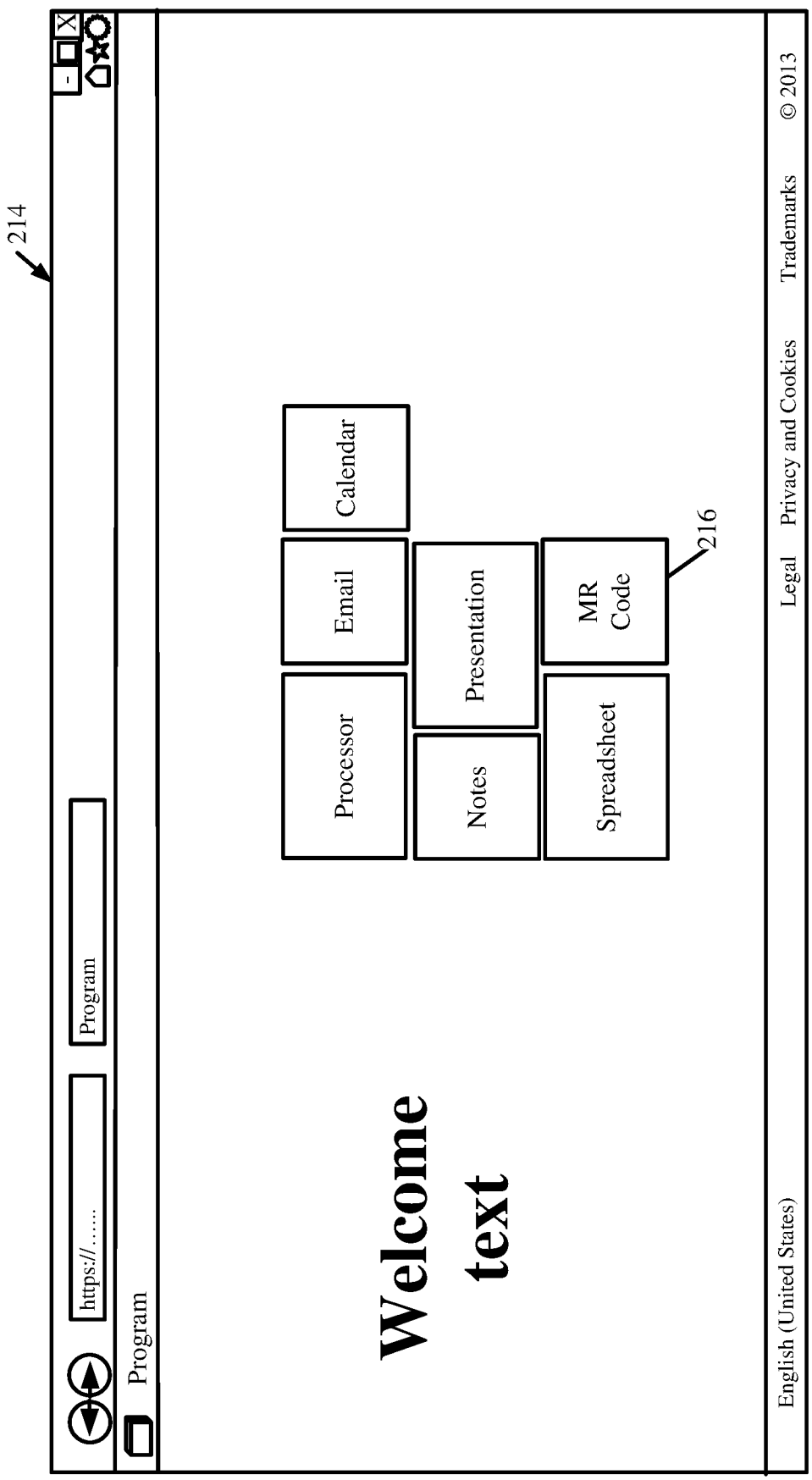
FIGS. 3A and 3B are illustrative user interface displays.

At some point, web-based remote control system 110 displays the MR code, that encodes the session ID, within browser 146. The display is illustratively generated on display device 144 of client device 104. This is indicated by block 212 of FIG. 3. FIG. 3A shows one illustrative user interface display indicating this. Display 214 in FIG. 3A is illustratively displayed within browser 146, on display device 144. It can include a variety of display elements corresponding to underlying applications. It also illustratively includes a display of the MR code (which in the embodiment shown in FIG. 3A is embodied as a QR code) 216.

User 136 then maneuvers mobile device 102 into place with respect to display device 144 so that user 136 can actuate the scanning component 118 of mobile device 102 in order to scan the QR code displayed on display device 146. This is indicated by block 218 in the flow diagram of FIG. 3.

Mobile device 102 then decodes the QR code to obtain the session ID that is encoded in the QR code. This is indicated by block 220 in FIG. 3. Mobile device 102 then sends the decoded session ID, along with the user's authentication token, to the session management system 108. This is indicated by block 222 in FIG. 3.

Session management system 108 (which manages various sessions within architecture 100) sends the session ID and the user's token for a specific session ID to the web-based remote control system 110. This is indicated by block 224 in FIG. 3. In response, the web-based remote control system authenticates the session ID. This is indicated by block 226 in FIG. 3. In doing so, browser matching component 166 illustratively matches browser 146 with the client remote control system 120. This is indicated by block 228. It also illustratively sets up a trusted data transmission channel between browser 146 and client remote control system 120 through web-based remote control system 110. This is indicated by block 230. The browser 146 and client remote control system 120 on mobile device 102 both set up connections with web-based remote control system 110. In one embodiment, they set up socket connections to obtain the trusted data transmission channel. This is indicated by block 232 in FIG. 3.

Web-based remote control system 110 then passes the user's token to browser 146, so that browser 146 can use it to obtain access to the user's content 156. This is indicated by block 234 in the flow diagram of FIG. 3. The authentication can be performed in other ways as well, and this is indicated by block 236.

Figure 3B:
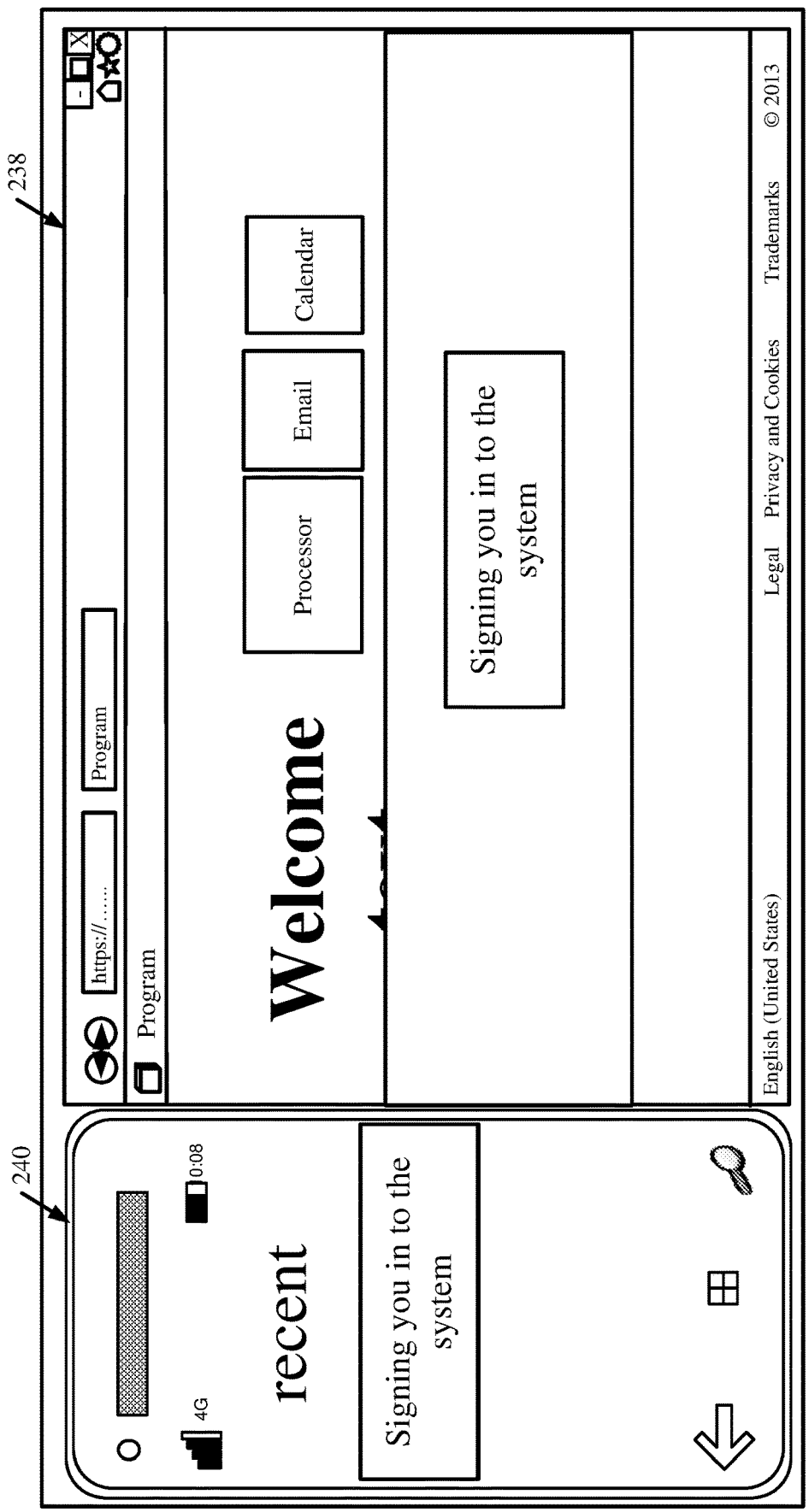

During the processing of blocks 222-236 in FIG. 3, the user interface components 116 and 140 on mobile device 102 and client device 104 can generate displays indicating that the signup process is being undertaken. FIG. 3B shows one example of this. User interface display 238 is one exemplary display that can be generated on the display device 144 of client device 104, and user interface display 240 is one example of a display that can be generated on the display device of mobile device 102.

Once the connection is established between browser 146 and client remote control system 120, the user can use the matched browser to perform remote control operations. This is indicated by block 242 in FIG. 3. For instance, link communication component 126 can send links, to content 156, to rendering component 148 in browser 146. This allows browser 146 to access the desired content. This is indicated by block 244 in FIG. 3. Rendering component 148 can then open the content on display device 144 of client device 104. This is indicated by block 246 in FIG. 3. Command communication component 130 can also send commands to command processing component 150 in browser 146 (again using the data transmission channel set up through web-based remote control system 110). This is indicated by block 248 in FIG. 3. Rendering component 148 can then perform presentation commands on presented content, based upon the commands received from command communication component 130 on mobile device 102. This is indicated by block 250. The system can be used in other ways as well, and this is indicated by block 252.

Figure 4:
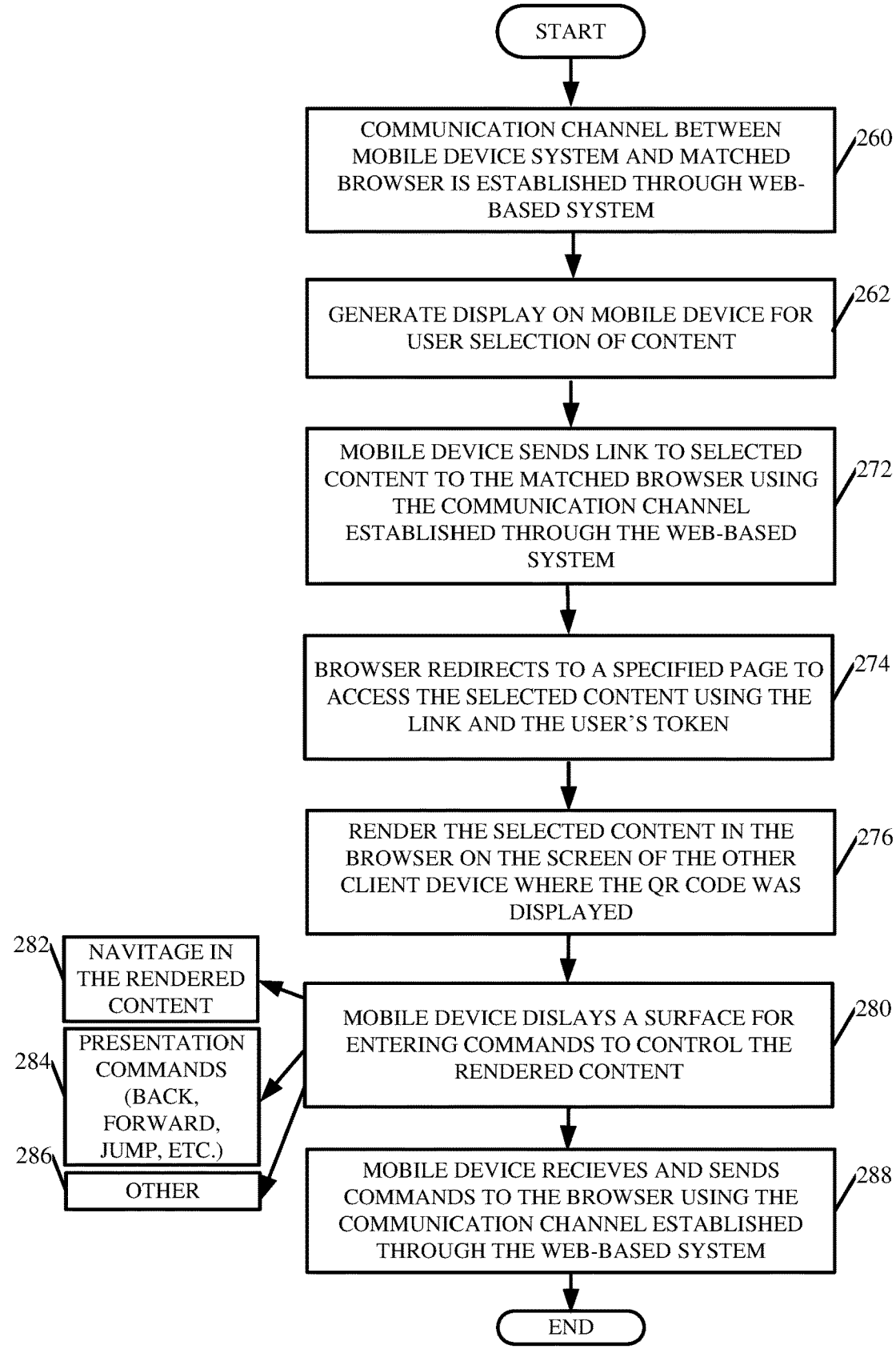
FIG. 4 is a flow diagram illustrating one embodiment of the operation of the architecture shown in FIG. 1 in allowing a user to display content on the client device, under the control of the mobile device.

FIG. 4 is a flow diagram illustrating one embodiment of how user 136 can present content on the display device 144 of client device 104, using mobile device 102. FIGS. 4A-4J are exemplary user interface displays. FIGS. 4-4J will now be described in conjunction with one another.

For purposes of FIG. 4, it is assumed that the communication channel between mobile device 102 (and specifically client remote control system 120 on mobile device 102) and browser 146 is already established through web-based remote control system 110. This is indicated by block 260 in FIG. 4. Visualization component 128 on mobile device 102 then generates a user interface display on mobile device 102 for user selection of content. This is indicated by block 262 in FIG. 4.

Figure 4A:
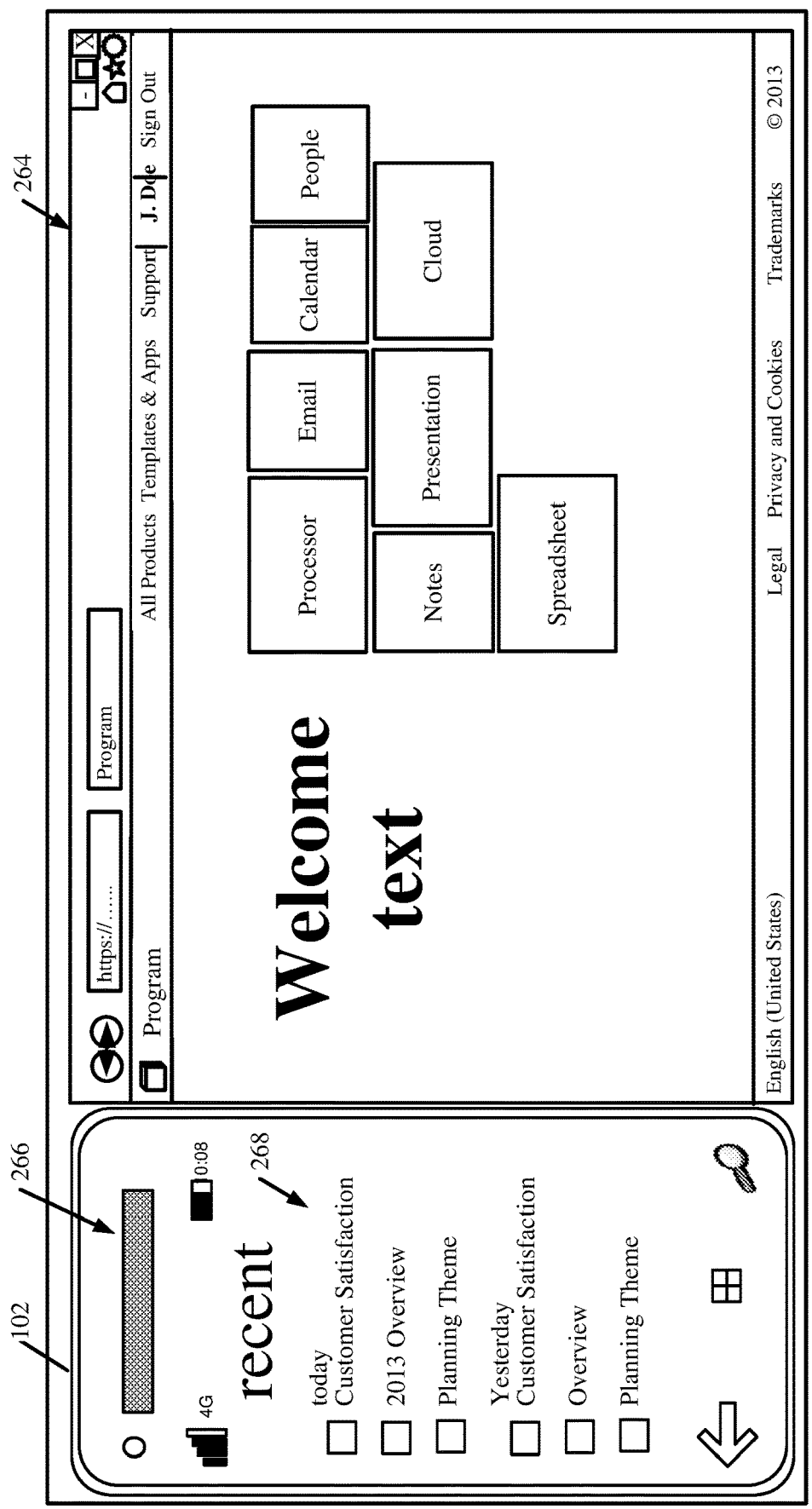
FIGS. 4A-4J are exemplary user interface displays.

FIG. 4A shows a set of user interface displays. User interface display 264 is displayed by browser 146 on display device 144 of client device 104. Display 266 is displayed by visualization component 128 on the display device of mobile device 102. In the embodiment shown in FIG. 4A, display 266 shows a list 268 of most recently used items, displayed in date order. Each item in the list is illustratively a user actuatable link that can be used to navigate to the corresponding content.

Figure 4B:
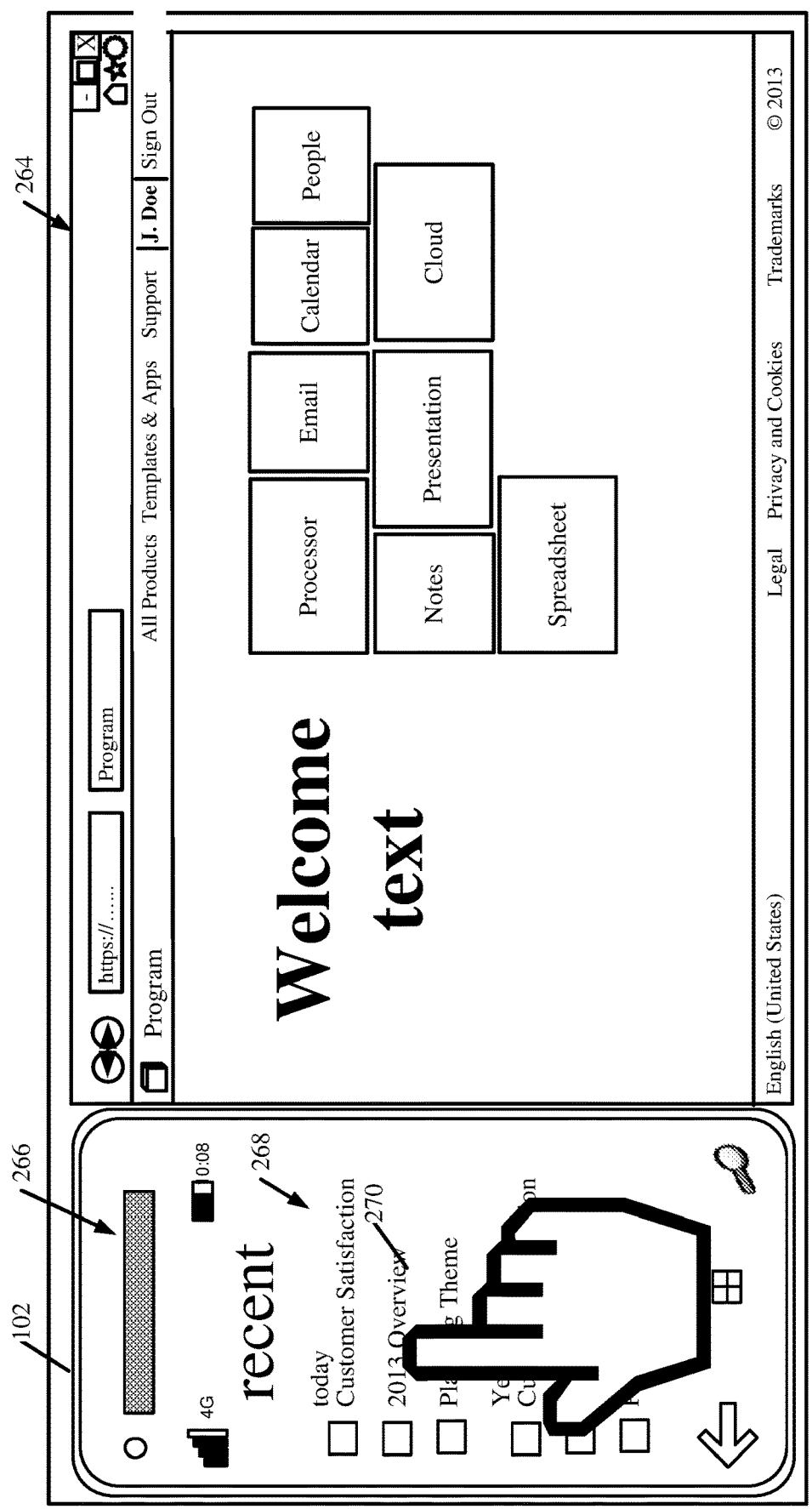

FIG. 4B is similar to FIG. 4A, and similar items are similarly numbered. However, FIG. 4B illustrates that a user is actuating a link 270 corresponding to underlying content, which is a slide presentation entitled "2013 Overview".

In response to user actuation of one of the links corresponding to underlying content on mobile device 102, link communication component 126 in client remote control system 120 sends the link (to the selected content) to browser 146 using the trusted communication channel established through the web-based remote control system 110. This is indicated by block 272 in FIG. 4. Upon receiving the link, browser 146 redirects to a specified page to access the selected content, using the link and the user's token.

By way of example, assume that the slide presentation entitled "2013 Overview", that was actuated by the user in the description of FIG. 4, is located in presentations 162 in the content 156. Browser 146 uses the user's token, and the link, to access the presentation from content 156. This is indicated by block 274 in the flow diagram of FIG. 4.

Figure 4C:
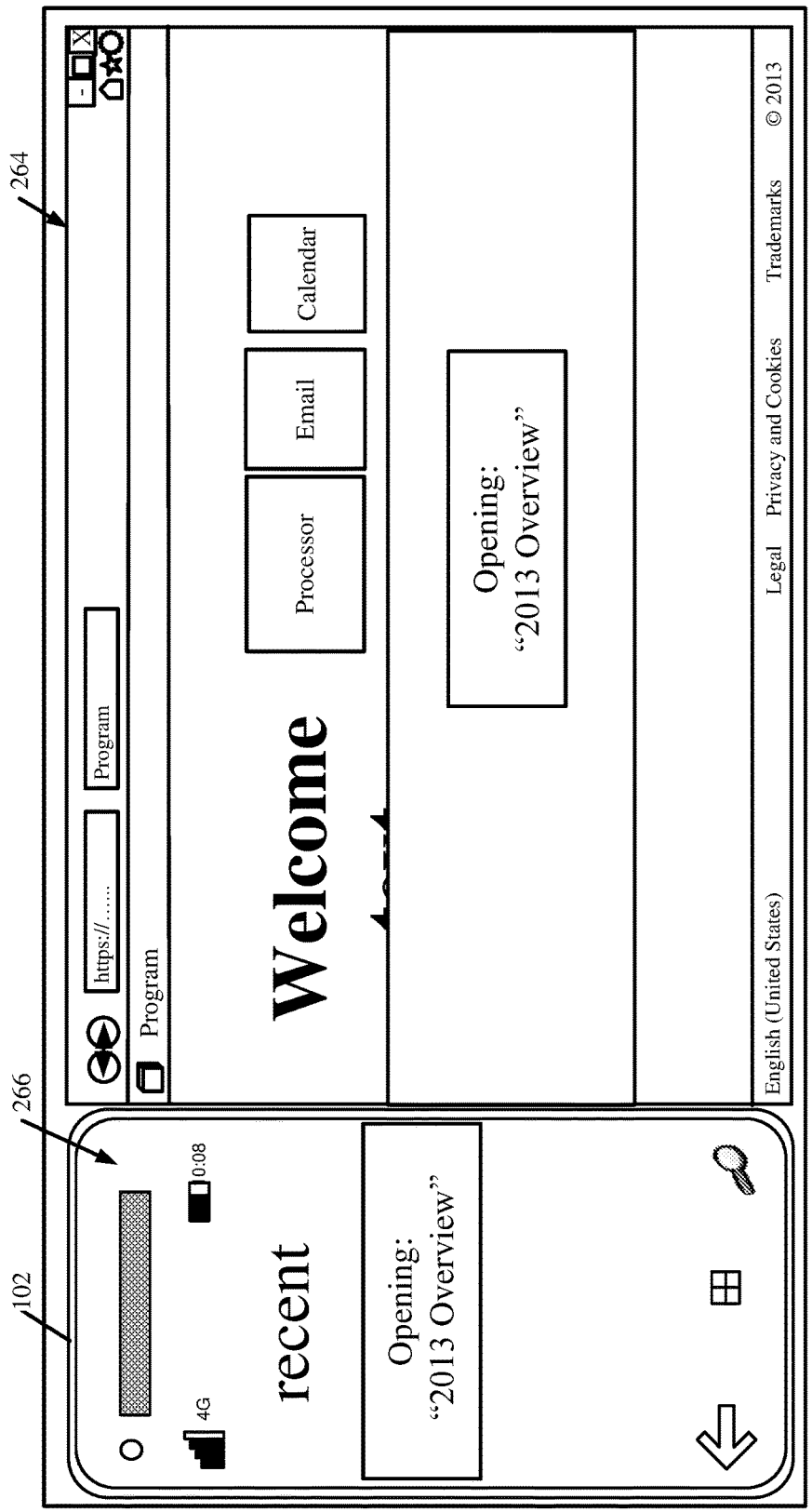

While this is happening, browser 146 and visualization component 128 can generate user interface displays on display device 144 and mobile device 102, respectively, indicating this. FIG. 4C shows one set of exemplary user interface displays 264 and 266.

Figure 4D:
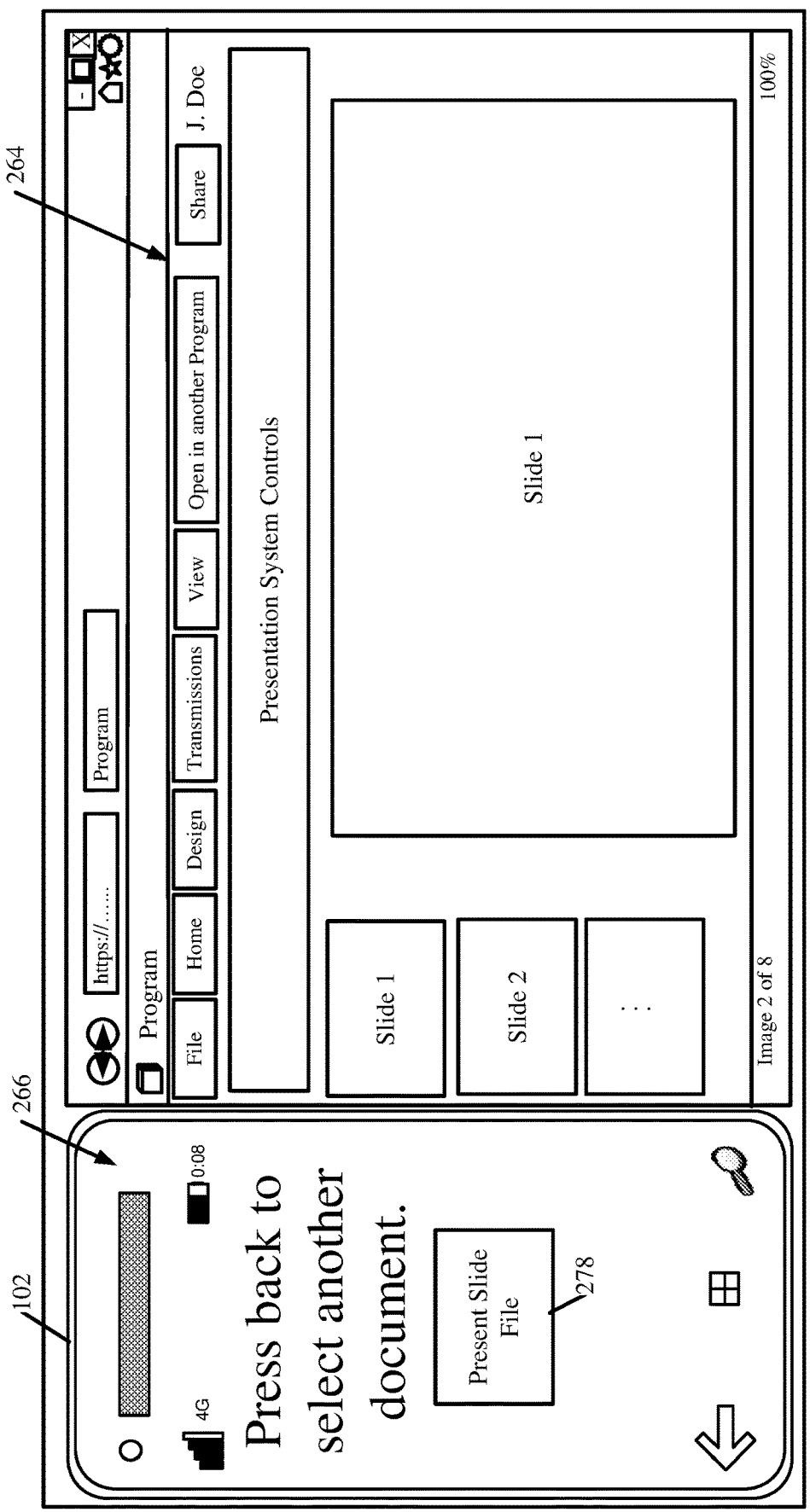

Once browser 146 accesses the content, rendering component 148 in browser 146 renders the content on display device 144 of client device 104. Rendering the selected content in the browser on the device where the QR code was displayed is indicated by block 276 in FIG. 4. FIG. 4D shows one set of exemplary user interfaces that indicate this.

The user interface display 264 on client device 104 shows that browser 146 has opened the application where the presentation resides, and is displaying the first slide of the presentation. Visualization component 128 on mobile device 102 generates display 266 that includes a user input mechanism 278 that allows the user to enter presentation mode so that the user can present the slide presentation on user interface display 264. Display 266 also includes an instruction for the user as to how to return to the most recently used list of items to select another item for display on user interface display 264. It can thus be seen that user interface display 264 on client device 104 is displaying the selected content, while user interface display 266 on mobile device 102 displays a surface for entering commands to control the rendered content on user interface display 264. Displaying the control surface on mobile device 102 is indicated by block 280 in the flow diagram of FIG. 4.

The surface displayed on mobile device 102 can include a wide variety of different user input mechanisms for performing a wide variety of different commands. For instance, the user input mechanisms can be navigation input mechanisms that allow the user to navigate within the selected content that is being displayed on user interface display 264 of client device 104. This is indicated by block 282 in FIG. 4. It can also include presentation command user input mechanisms so that the user can easily provide presentation commands (such as back, forward, jump, enter presentation mode, etc.) for the selected content. This is indicated by block 284. Of course, the command surface can include a wide variety of other commands as well, and this is indicated by block 286.

Also, while the present discussion proceeds with respect to the example in which commands and navigation inputs are provided through the displayed surface, they can be provided in other ways as well. For instance, they can be provided by an operator shaking device 102, tapping it, using it as a virtual laser pointer or providing other inputs that can be sensed by an accelerometer or other sensors on device 102.

As the user is controlling the content by entering commands on mobile device 102, visualization component 128 on mobile device 102 receives those inputs and command communication component 130 sends those commands to the command processing component 150 of browser 146 using the communication channel established through the web-based remote control system 110. This is indicated by block 288. In response, browser 146 reacts to those commands and renders the selected content in the desired manner.

Figure 4E:
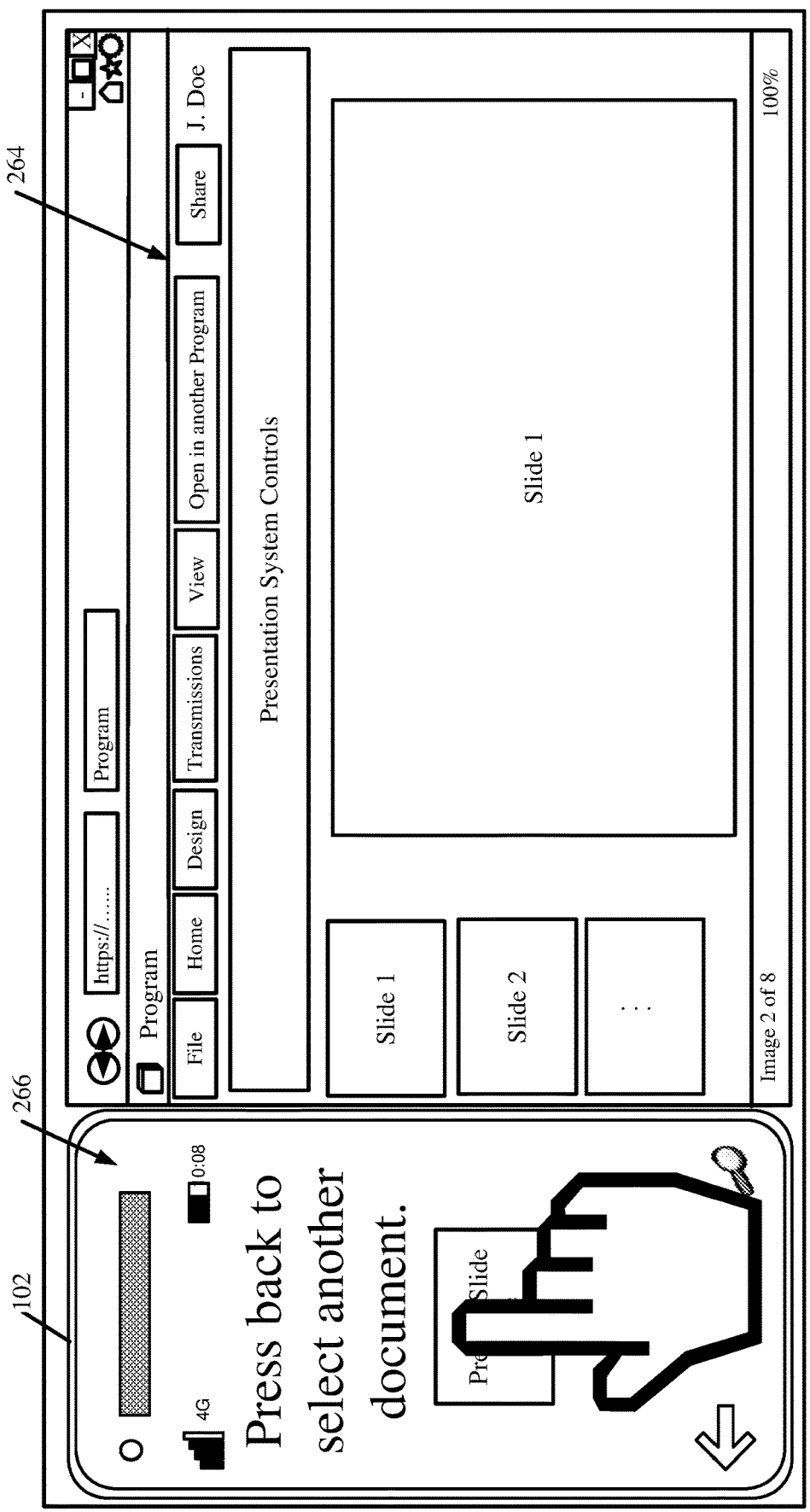
Figure 4F:
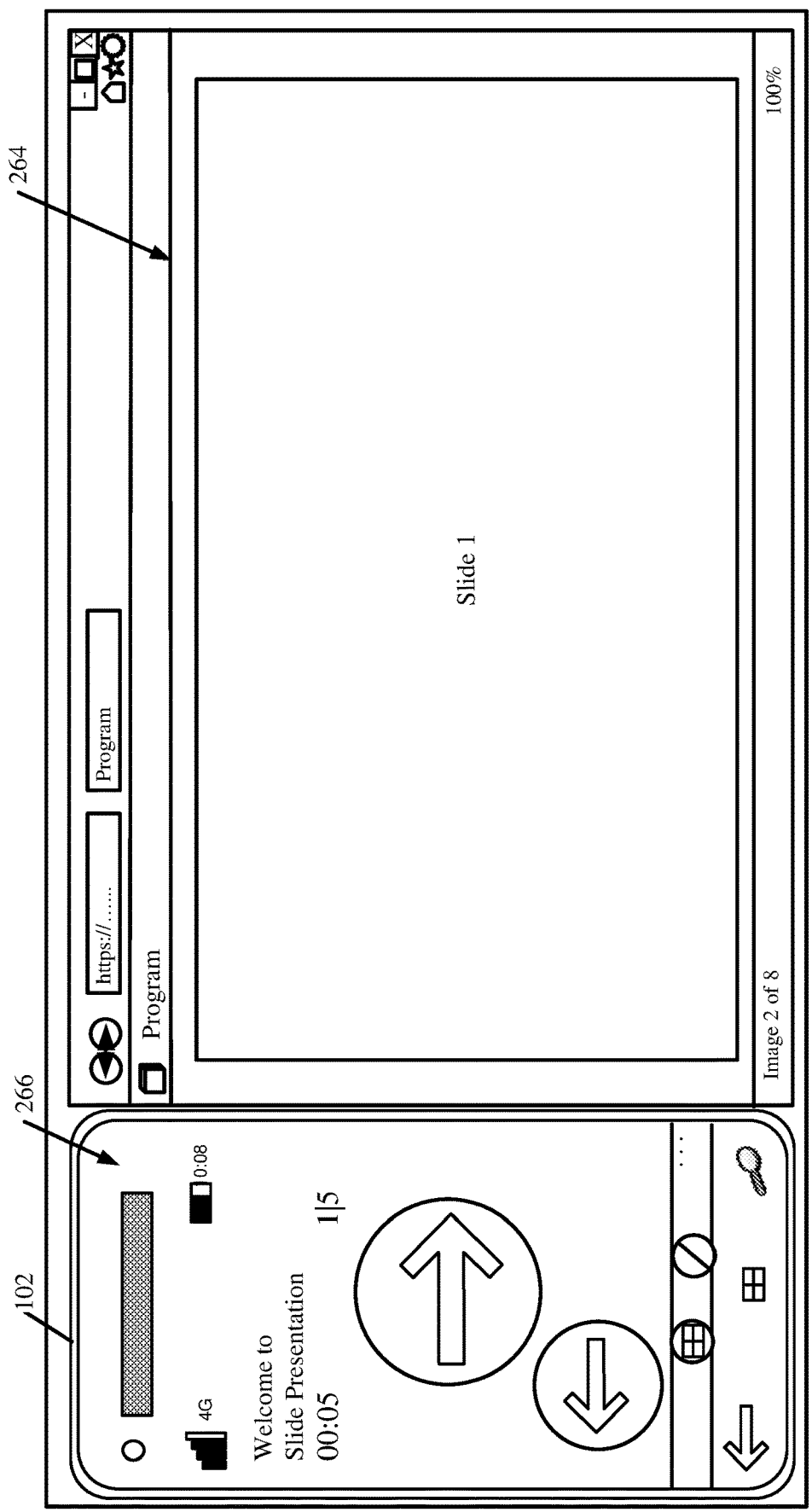
Figure 4G:
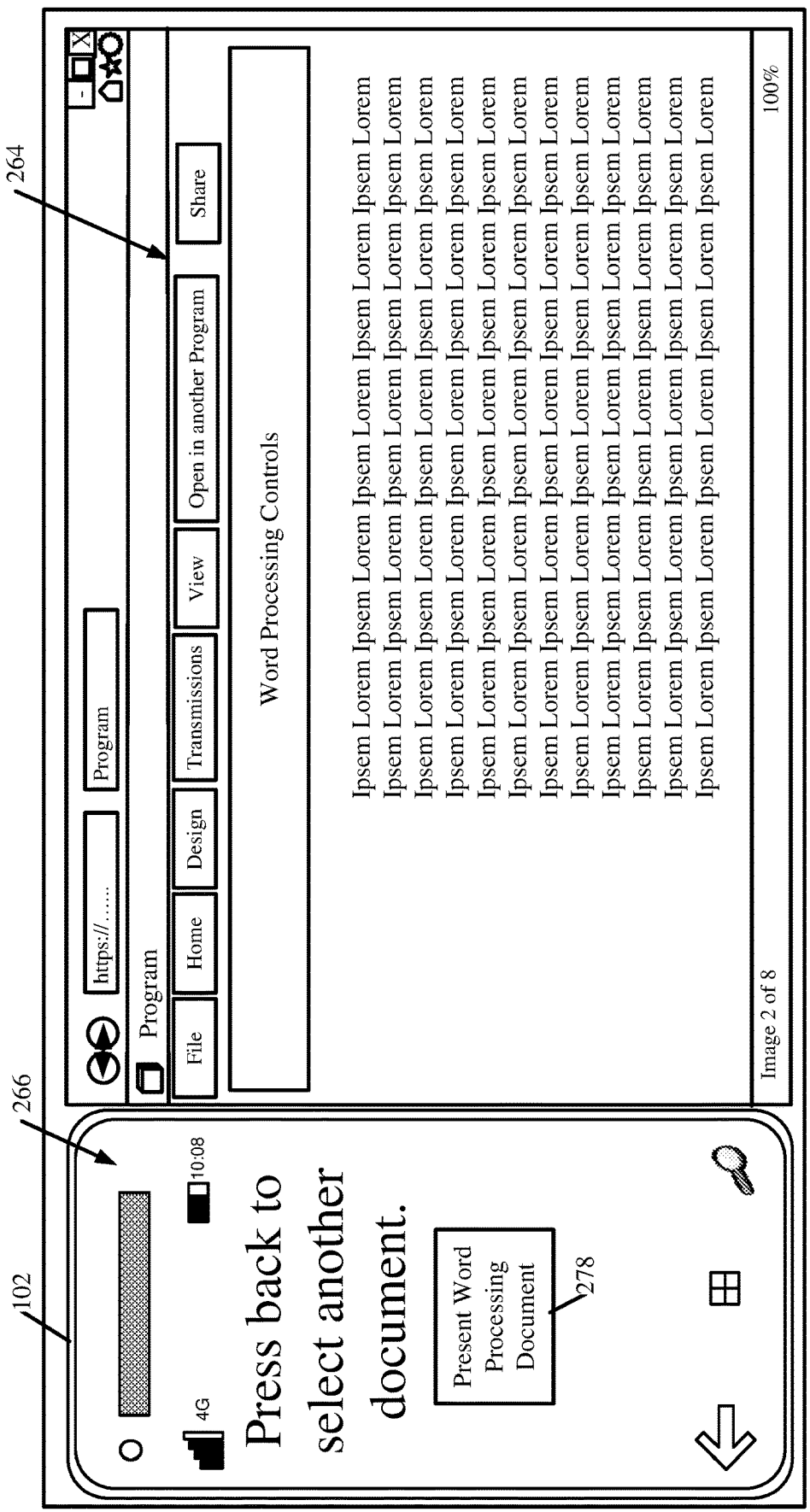
Figure 4H:
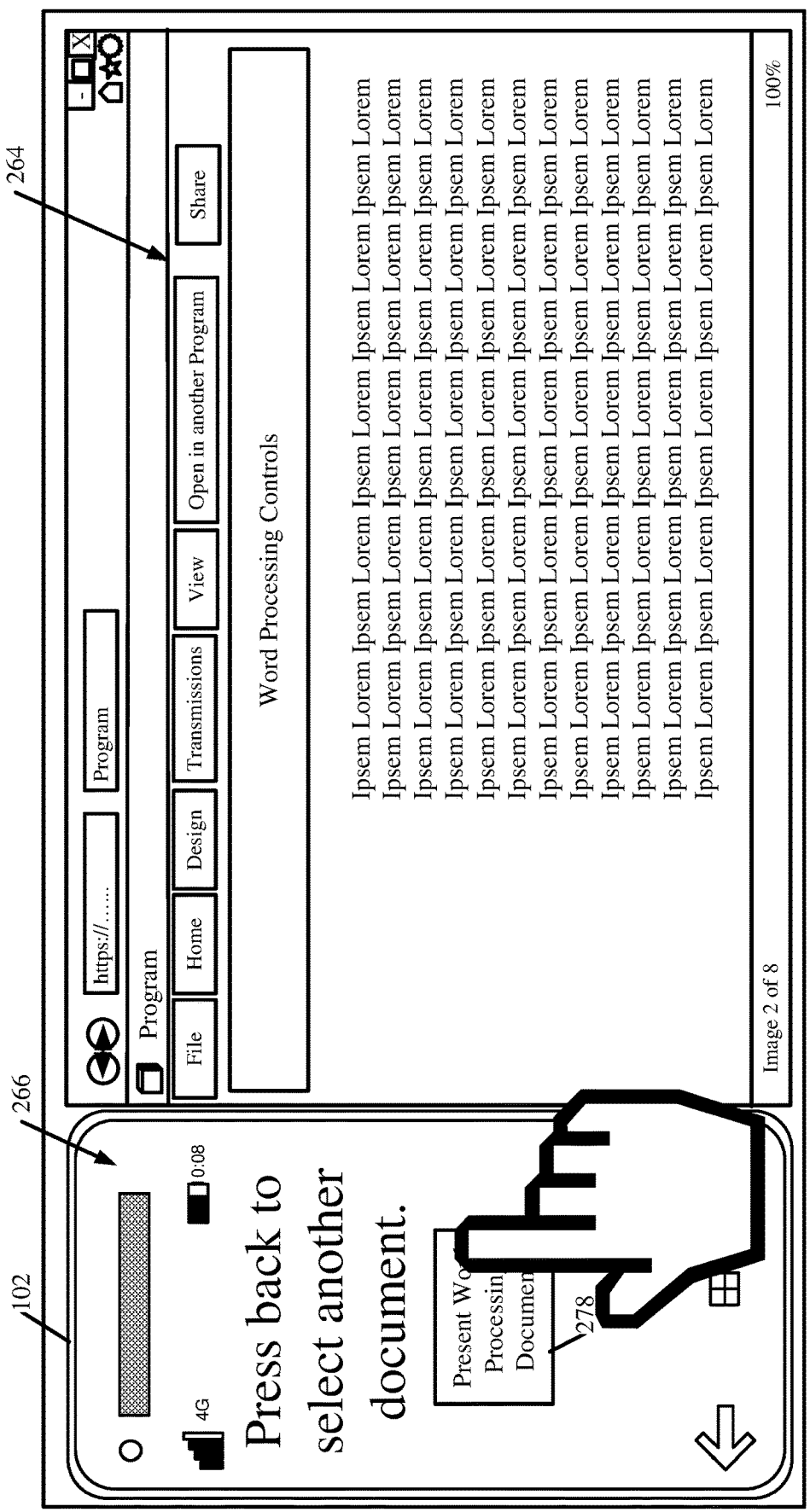
Figure 4I:
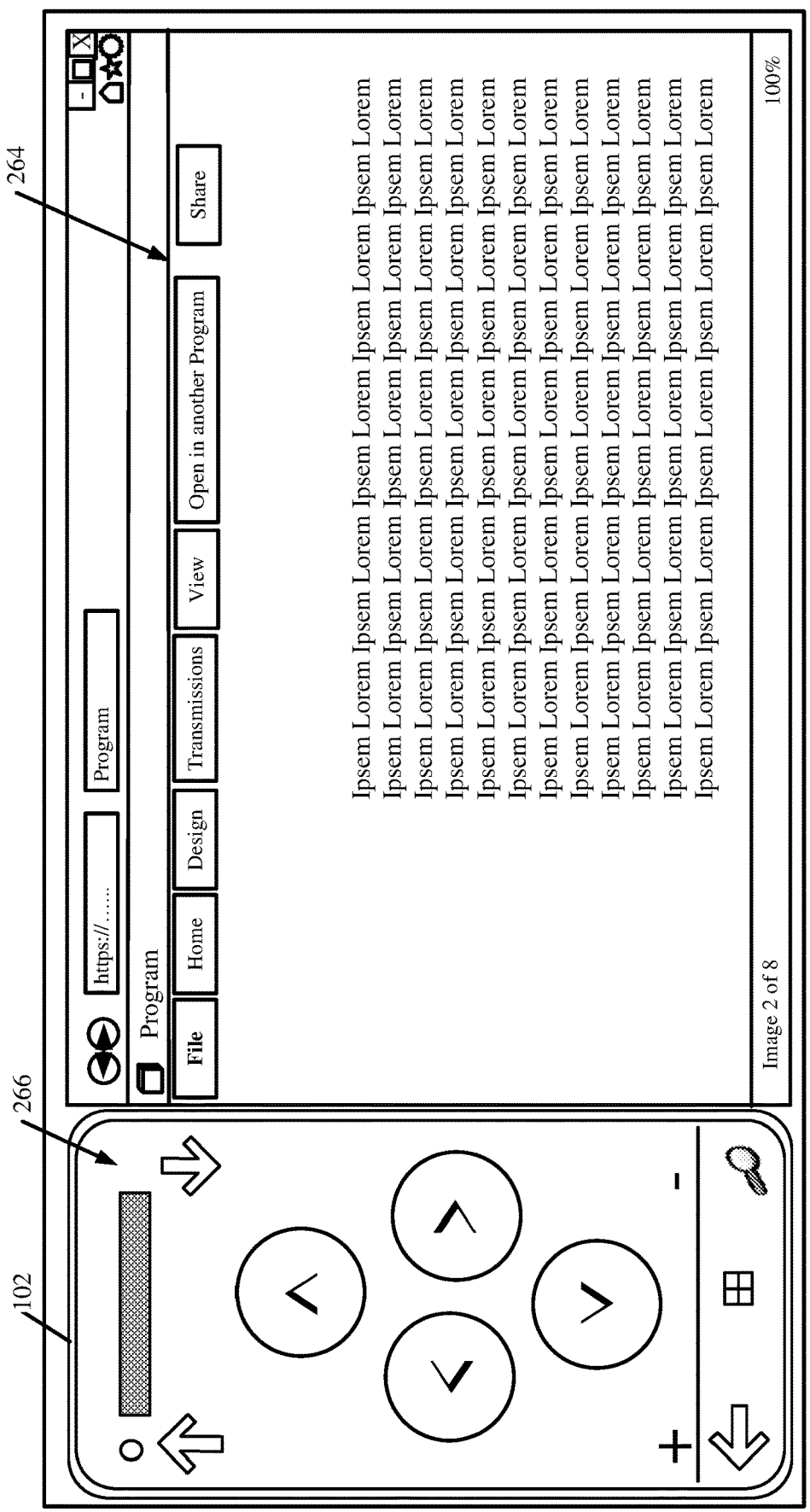
Figure 4J:
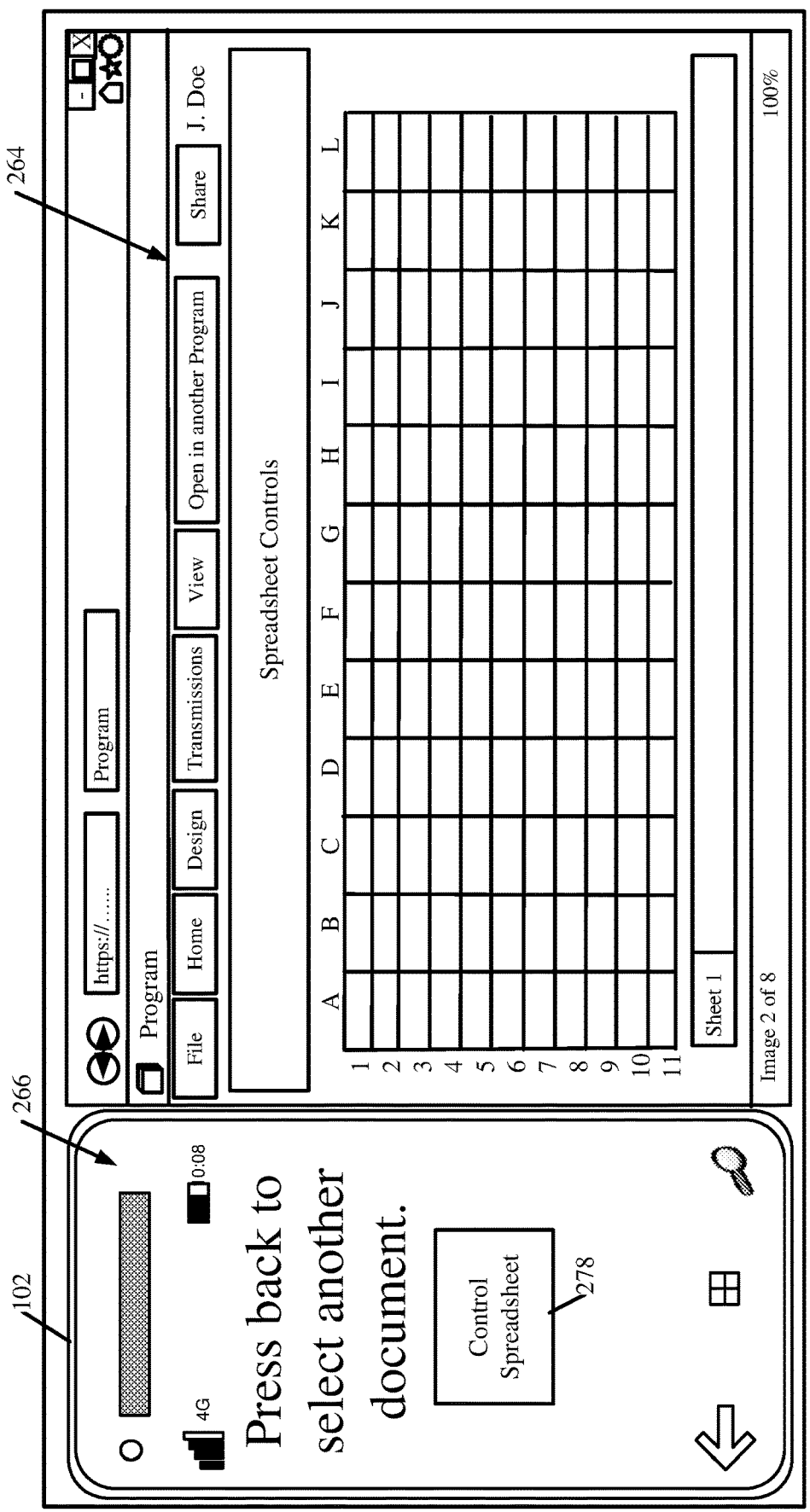

FIGS. 4E-4J show a number of different sets of user interface displays that illustrate this. FIG. 4E is similar to FIG. 4D except that it shows that the user is actuating the user input mechanism 278 on the user interface display 266 of mobile device 102. This indicates that the user wishes to enter presentation mode for the selected content shown in the user interface display 264 of client device 104.

In response, command processing component 150 on browser 146 processes this command and causes the selected content to be rendered in presentation mode. FIG. 4F shows one illustrative set of user interface displays that indicates this. FIG. 4F shows that the user interface display 264 on client device 104 has now entered the presentation mode, where the slide takes up substantially the entire display surface. FIG. 4F also shows that visualization component 128 on mobile device 102 is now displaying a control surface that allows the user to send presentation commands to browser 146 to control presentation of the selected content on user interface display 264. For instance, user interface display 166 on mobile device 102 includes command buttons that allow the user to move forward or backward or to jump through the various slides in the selected content being displayed on client device 104.

FIG. 4G shows another exemplary set of user interface displays that can be generated when the user has selected a word processing document, instead of a slide presentation. FIG. 4G is similar to FIG. 4D except that the user interface display 264 generated by browser 146 on client device 104 has now opened a word processing document. Similarly, the user interface display 166 on mobile device 102 has the user input mechanism 278, but instead of indicating that it will enter the presentation mode for a slide presentation, it now indicates that, if it is actuated, it will enter presentation mode for a word processing document.

FIG. 4H is similar to FIG. 4G, except that it shows that the user is now actuating user input mechanism 278, indicating that the user wishes to present the word processing document that is opened within browser 146. In response, command communication component 130 on mobile device 102 sends this command to the command processing component 150 in browser 146, over the secured communication channel established through web-based remote control system 110. Browser 146 thus enters presentation mode for the word processing document.

FIG. 4I shows one illustrative set of user interface displays indicating this. It can be seen in FIG. 4I that rendering component 148 in browser 146 has now rendered the word processing document in presentation mode. It can also be seen in FIG. 4I that the visualization component 128 on mobile device 102 has now rendered a command surface on user interface display 266 of mobile device 102, so that the user can provide navigation commands to navigate through the word processing document displayed in browser 146 on client device 104.

FIG. 4J shows yet another set of user interface displays. They indicate that the user has selected a spreadsheet document. It can thus be seen that browser 146 has accessed the spreadsheet document and opened it on the user interface display 264 of client device 104. Similarly, visualization component 128 on mobile device 102 has generated a control surface 266 that allows the user to either enter into a control mode for controlling navigation on the spreadsheet (by actuating user input mechanism 278) or to return to the most recently used list (or another surface) to select another item of content.

It can thus be seen that the architecture provides the ability to use a device that is already signed in (such as a mobile phone application) as a source of identity to use when logging into another device. It also provides the ability to pair a phone and another screen on another computing device so that they can communicate in a trusted way. This reduces the number of steps that normal code matching requires and it also reduces the amount of input needed for systems that have a user enter a personal identification number. One of the devices simply displays an MR code, the other device scans it, and a third-party creates a communication channel between the two. It also illustratively provides the ability to send a link to selected content to a listening service (such as a browser window) that downloads and starts presentation of the selected content, rendering it remotely. The presentation can then be controlled by the mobile device, by sending only relatively simple commands to the rendering computing device. It also provides the ability to select a document on a mobile device and have it open on a paired screen. Rather than uploading the document directly from the mobile device to the device that uses the paired screen, it simply passes a link to the selected content, and the paired screen device then accesses it using that link.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
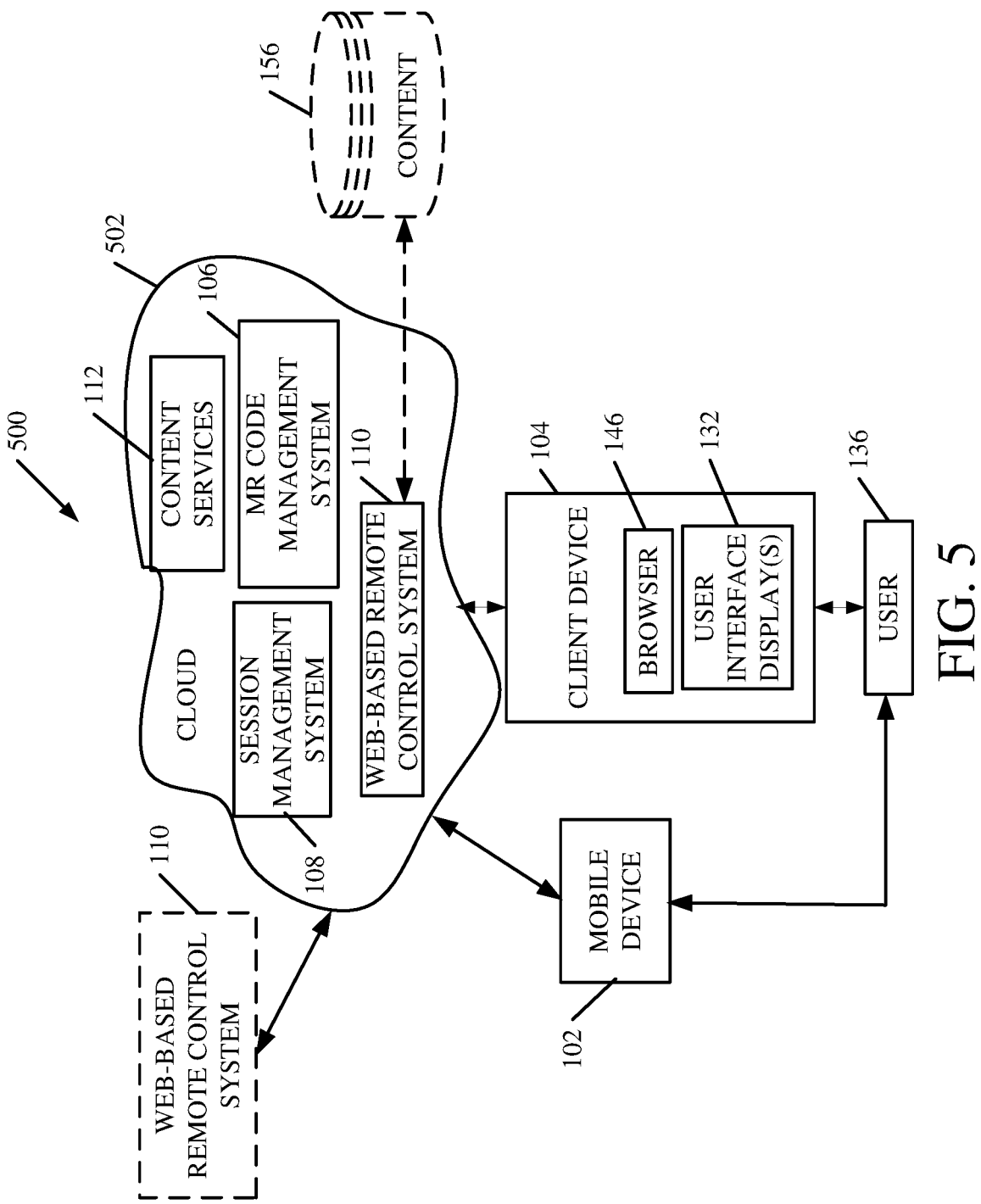
FIG. 5 is a block diagram of one embodiment of the architecture shown in FIG. 1, deployed in a cloud computing architecture.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 5, some items are similar to those shown in FIG. 1 and they are similarly numbered. FIG. 5 specifically shows that systems 106, 108 and 110 can be located in cloud 502 (which can be public, private, or a combination where portions are public while others are private). Therefore, user 136 uses client device 104 to access those systems through cloud 502.

FIG. 5 also depicts another embodiment of a cloud architecture. FIG. 4 shows that it is also contemplated that some elements of architecture 100 can be disposed in cloud 502 while others are not. By way of example, content 156 can be disposed outside of cloud 502, and accessed through cloud 502. In another embodiment, system 110 can also be outside of cloud 502. Regardless of where they are located, they can be accessed directly by device 104, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
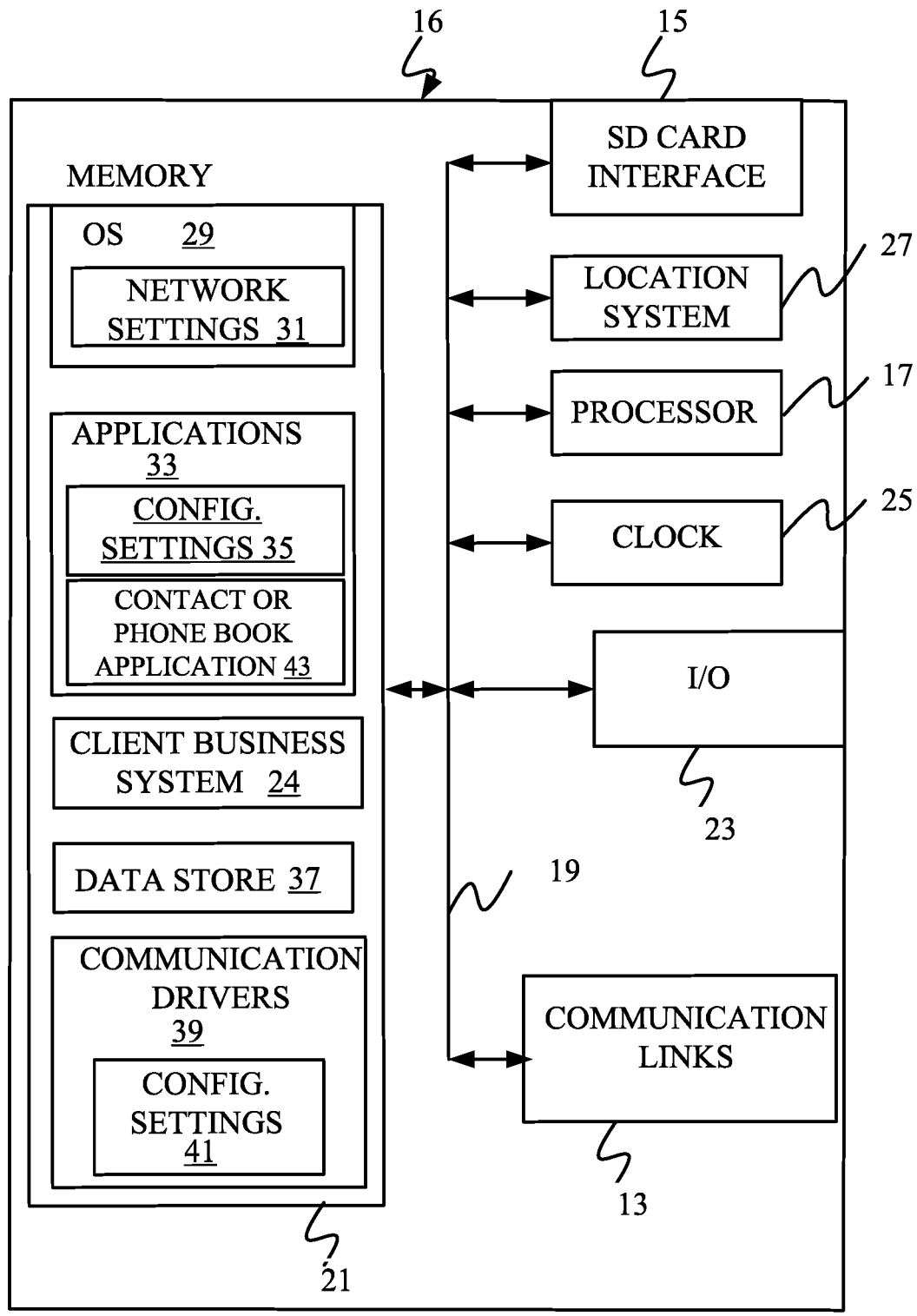
FIGS. 6-10 show various embodiments of mobile devices.

FIG. 6 is a simplified block diagram of one illustrative embodiment of a handheld or mobile computing device that can be used as a user's or client's hand held device 16, in which the present system (or parts of it) can be deployed. FIGS. 7-10 are examples of handheld or mobile devices.

FIG. 6 provides a general block diagram of the components of a client device 16 (which can comprise client device 104 or mobile device 102 in preceding Figures) that can run components of or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processors 124, 186 or 190 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 7:
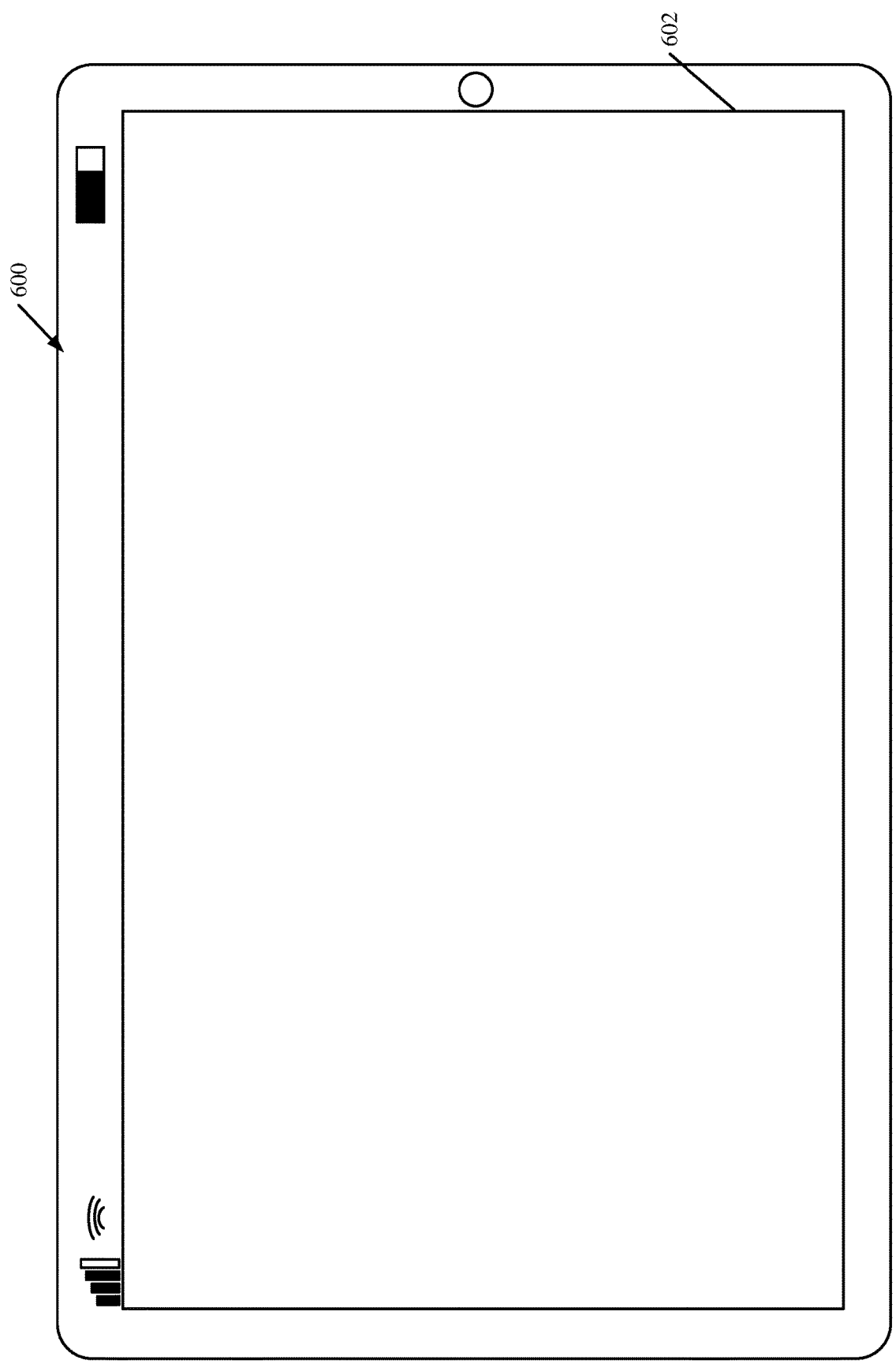

FIG. 7 shows one embodiment in which device 16 is a tablet computer 600. Computer 600 can comprise either client device 104 or mobile device 102 from previous Figures. In FIG. 7, computer 600 is shown with user interface display on the display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 8:
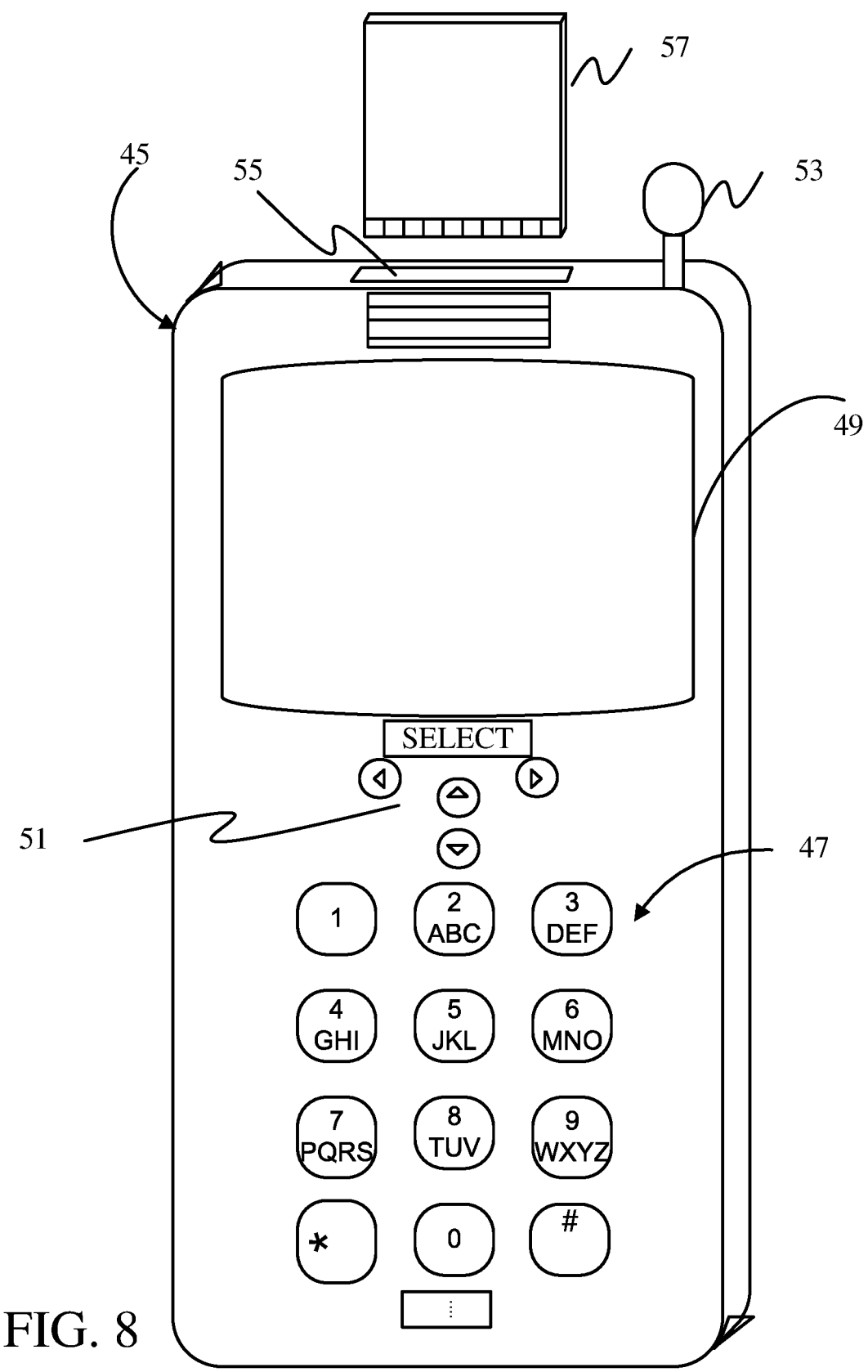
Figure 9:
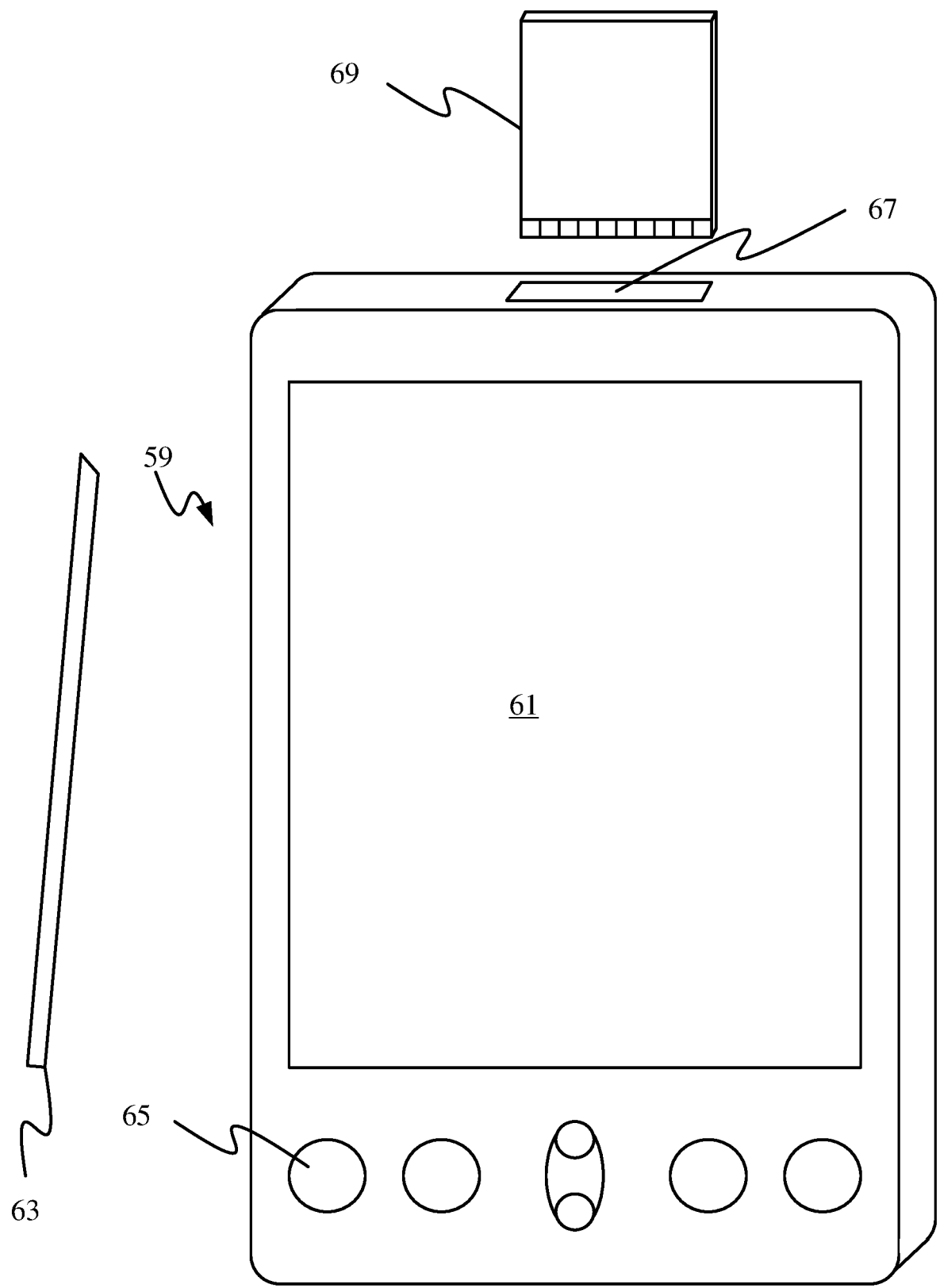

FIGS. 8 and 9 provide additional examples of devices 16 that can be used, although others can be used as well. In FIG. 8, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1Xrtt, and Short Message Service (SMS) signals. In some embodiments, phone 45 also includes a Secure Digital (SD) card slot 55 that accepts a SD card 57.

The mobile device of FIG. 9 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Figure 10:
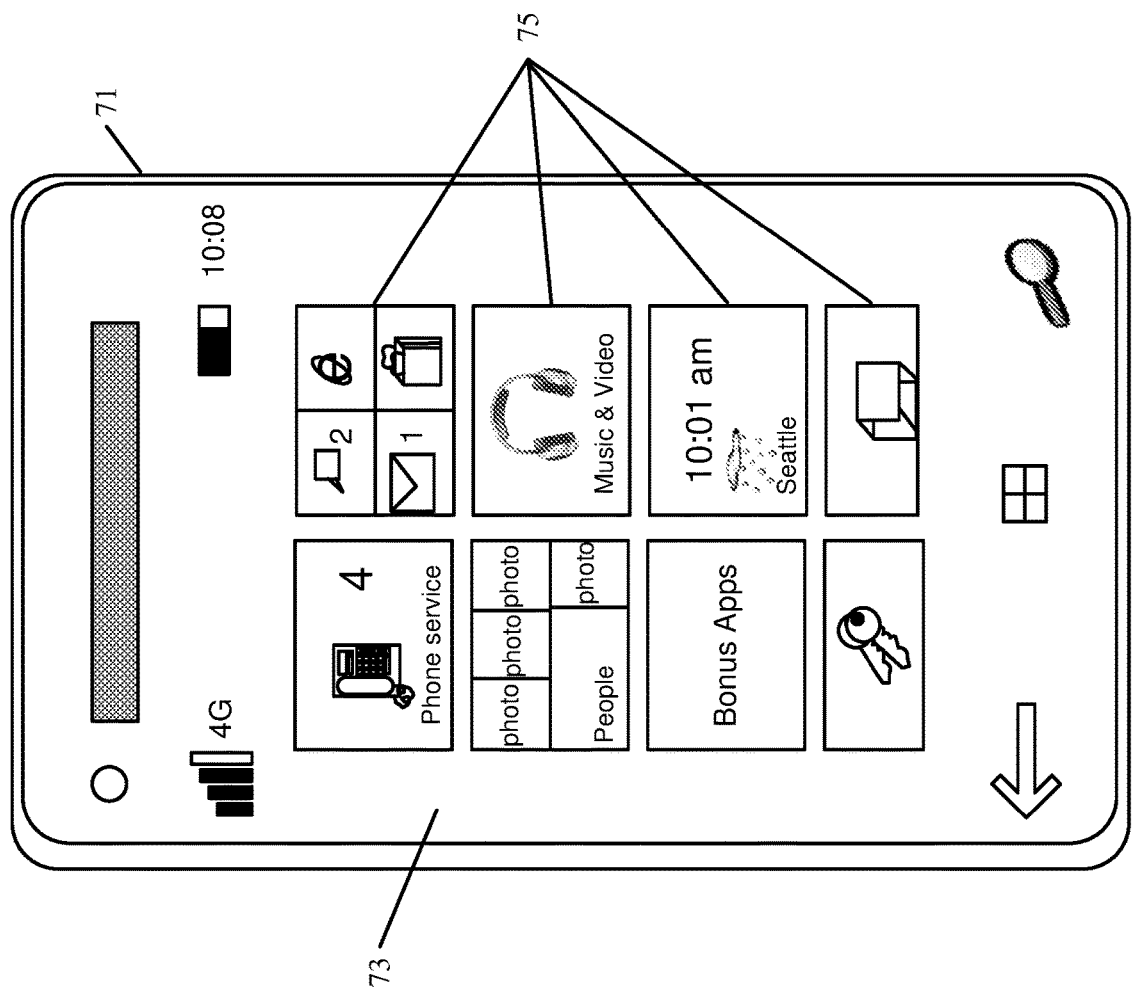

FIG. 10 is similar to FIG. 8 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
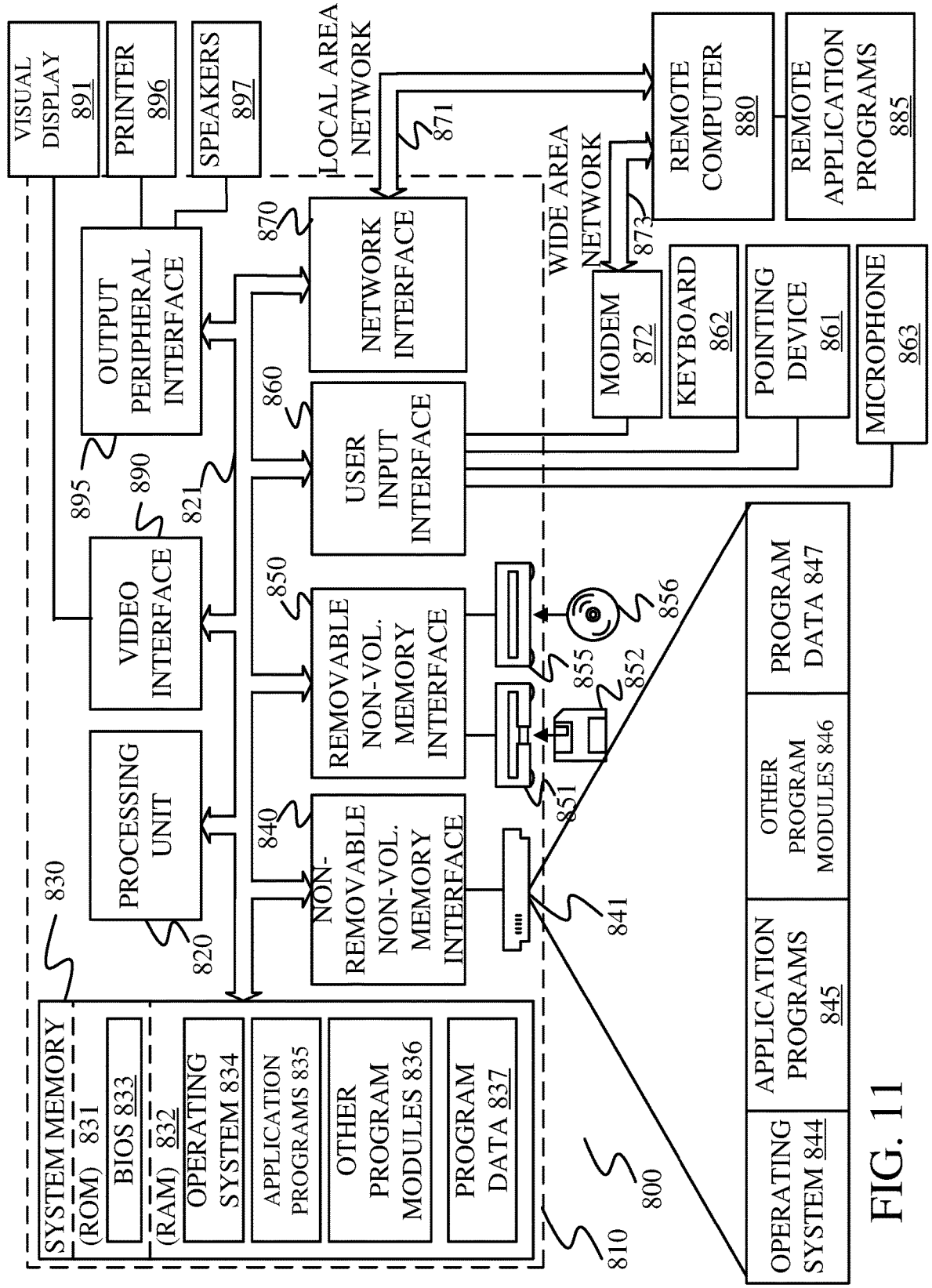
FIG. 11 is a block diagram of one illustrative computing environment.

FIG. 11 is one embodiment of a computing environment in which architecture 100, or parts of it, (for example) can be deployed. With reference to FIG. 11, an exemplary system for implementing some embodiments includes a general-purpose computing device in the form of a computer 810. Components of computer 810 may include, but are not limited to, a processing unit 820 (which can comprise processor 114 or 138), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 11 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 11 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A server computing system comprising:
    at least one processor; and
    memory storing instructions executable by the at least one processor, wherein the instructions, when executed, configure the server computing system to:
    send a machine readable (MR) code to a first computing device;
    receive, from a second computing device, an indication that the second computing device scanned the MR code on the first computing device;
    based on the received indication, authorize the second computing device to access functionality on the server computing system; and based on the authorization, send content from the server computing system to the second computing device through a communication channel.

2. The server computing system of claim 1, wherein the instructions configure the server computing system to:
   receive a user credential associated with a user of the second computing device; and
   based on authentication of the user using the received user credential, authorize the second computing device to access the functionality.

3. The server computing system of claim 1, wherein the instructions configure the server computing system to:
   configure the communication channel between the server computing system and the second computing device based on the authorization.

4. The server computing system of claim 1, wherein the instructions configure the server computing system to:
   generate the MR code.

5. The server computing system of claim 1, wherein the instructions configure the server computing system to:
   send an instruction to the first computing device to display the MR code.

6. The server computing system of claim 1, wherein the MR code comprises a matrix barcode.

7. A method performed by a server computing system, the method comprising:
   sending a machine readable (MR) code to a first computing device;
   receiving, from a second computing device, an indication that the second computing device scanned the MR code on the first computing device;
   based on the received indication, authorizing the second computing device to access functionality on the server computing system; and
   based on the authorization, sending content from the server computing system to the second computing device through a communication channel.

8. The method of claim 7, and further comprising:
   receiving a user credential associated with a user of the second computing device; and
   based on authentication of the user using the received user credential, authorizing the second computing device to access the functionality.

9. The method of claim 7, and further comprising:
   configuring the communication channel between the server computing system and the second computing device based on the authorization.

10. The method of claim 7, and further comprising:
    generating the MR code.

11. The method of claim 7, and further comprising:
    sending an instruction to the first computing device to display the MR code.

12. The method of claim 7, wherein the MR code comprises a matrix barcode.

* * * * *